United States Patent
Zenkich

(10) Patent No.: US 10,999,599 B2
(45) Date of Patent: May 4, 2021

(54) SYSTEM AND METHOD FOR NON-UNIFORM VIDEO CODING

(71) Applicant: Raymond Zenkich, Evanston, IL (US)

(72) Inventor: Raymond Zenkich, Evanston, IL (US)

( * ) Notice: Subject to any disclaimer, the term of this patent is extended or adjusted under 35 U.S.C. 154(b) by 0 days.

(21) Appl. No.: 16/908,937

(22) Filed: Jun. 23, 2020

(65) Prior Publication Data
US 2020/0322629 A1 Oct. 8, 2020

Related U.S. Application Data

(63) Continuation of application No. 16/238,822, filed on Jan. 3, 2019, now abandoned, which is a continuation of application No. 14/218,073, filed on Mar. 18, 2014, now Pat. No. 10,205,962.

(60) Provisional application No. 61/790,808, filed on Mar. 15, 2013.

(51) Int. Cl.
*H04N 19/573* (2014.01)
*H04N 19/587* (2014.01)

(52) U.S. Cl.
CPC ......... *H04N 19/573* (2014.11); *H04N 19/587* (2014.11)

(58) Field of Classification Search
CPC .......................... H04N 19/573; H04N 19/587
See application file for complete search history.

(56) References Cited

U.S. PATENT DOCUMENTS

| | | | |
|---|---|---|---|
| 4,771,331 A * | 9/1988 | Bierling | H04N 5/145 348/E5.066 |
| 7,978,770 B2 | 7/2011 | Luo et al. | |
| 8,265,156 B2 | 9/2012 | Lee et al. | |
| 8,374,245 B2 | 2/2013 | Tourapis et al. | |
| 2003/0174777 A1 | 9/2003 | Itoh et al. | |
| 2005/0013497 A1 | 1/2005 | Hsu et al. | |
| 2005/0013498 A1 | 1/2005 | Srinivasan et al. | |
| 2005/0053294 A1 | 3/2005 | Mukerjee et al. | |
| 2006/0092321 A1 | 5/2006 | Ogino et al. | |
| 2007/0297511 A1 | 12/2007 | Chiu et al. | |
| 2011/0200108 A1 * | 8/2011 | Joshi | H04N 19/61 375/240.16 |
| 2012/0106642 A1 | 5/2012 | Letunovskiy et al. | |
| 2012/0314769 A1 | 12/2012 | Lee et al. | |

(Continued)

OTHER PUBLICATIONS

Zhang Yue-Yang, et al. "A Predictive VQ Based Video Compression Scheme." IJCSES International Journal of Computer Sciences and Engineering Systems. vol. 1, No. 3, Jul. 2007: 155-158.

(Continued)

*Primary Examiner* — James M Pontius
(74) *Attorney, Agent, or Firm* — Maier & Maier, PLLC

(57) ABSTRACT

A method and system for video coding by integrating frame data and time data may be described. The method and system can include a video coding non-transitory storage media that integrates reference data and time data. More specifically, the video coding non-transitory storage media can produce one or more luma vectors and one or more chroma vectors within a video plane, the one or more luma vectors and one or more chroma vectors may be extended into time vectors that can be utilized for compression or reconstruction of the frame rate, define luma vector across time as a contiguous function and perform video compression across a time dimension.

4 Claims, 29 Drawing Sheets

(56) References Cited

U.S. PATENT DOCUMENTS

2012/0328013 A1    12/2012  Budagavi et al.
2013/0013808 A1    1/2013   Richardson et al.
2013/0039421 A1    2/2013   Lee et al.

OTHER PUBLICATIONS

International Search Report for PCT/US2014/031007 dated Jul. 24, 2014.

* cited by examiner

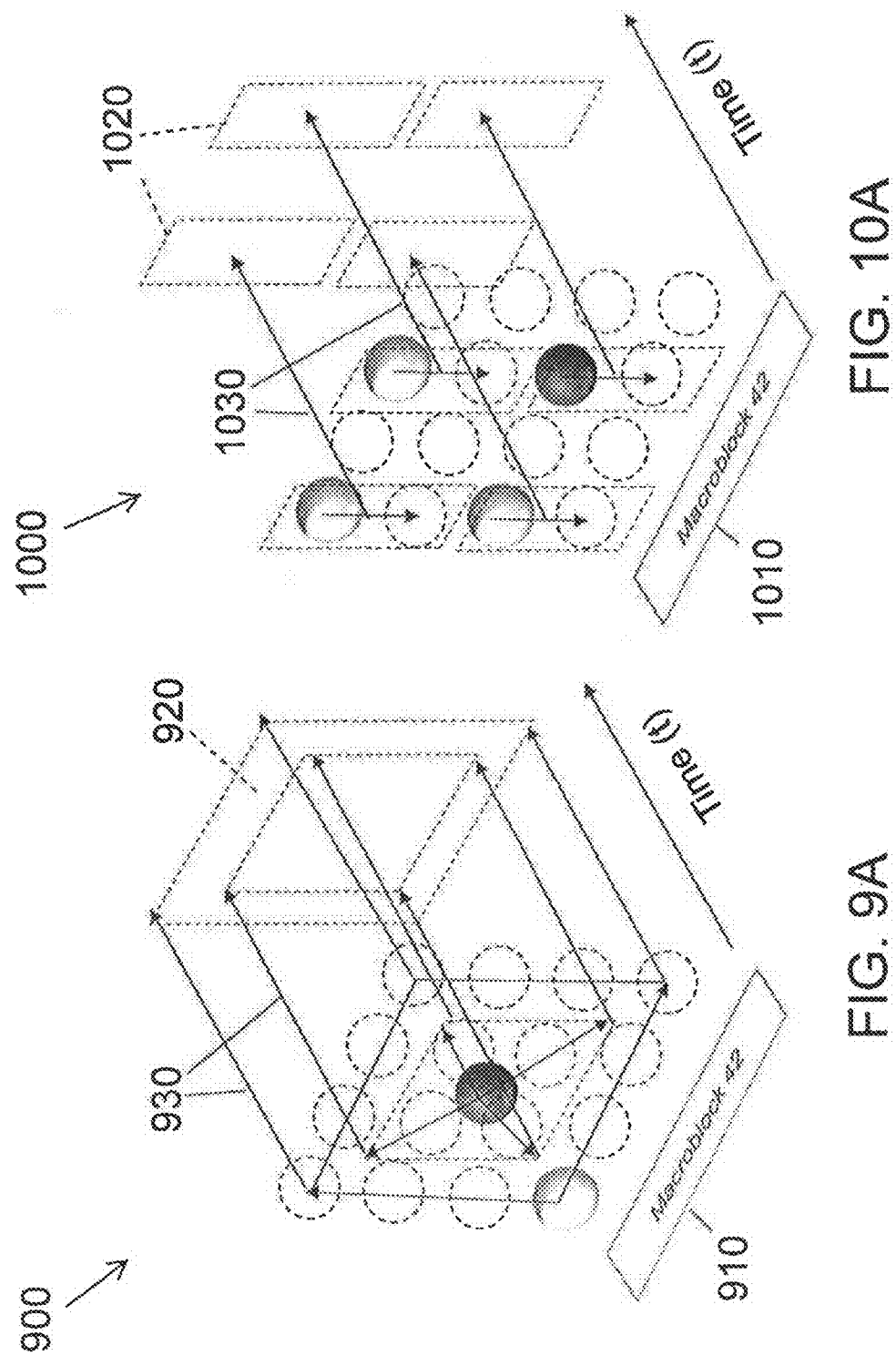

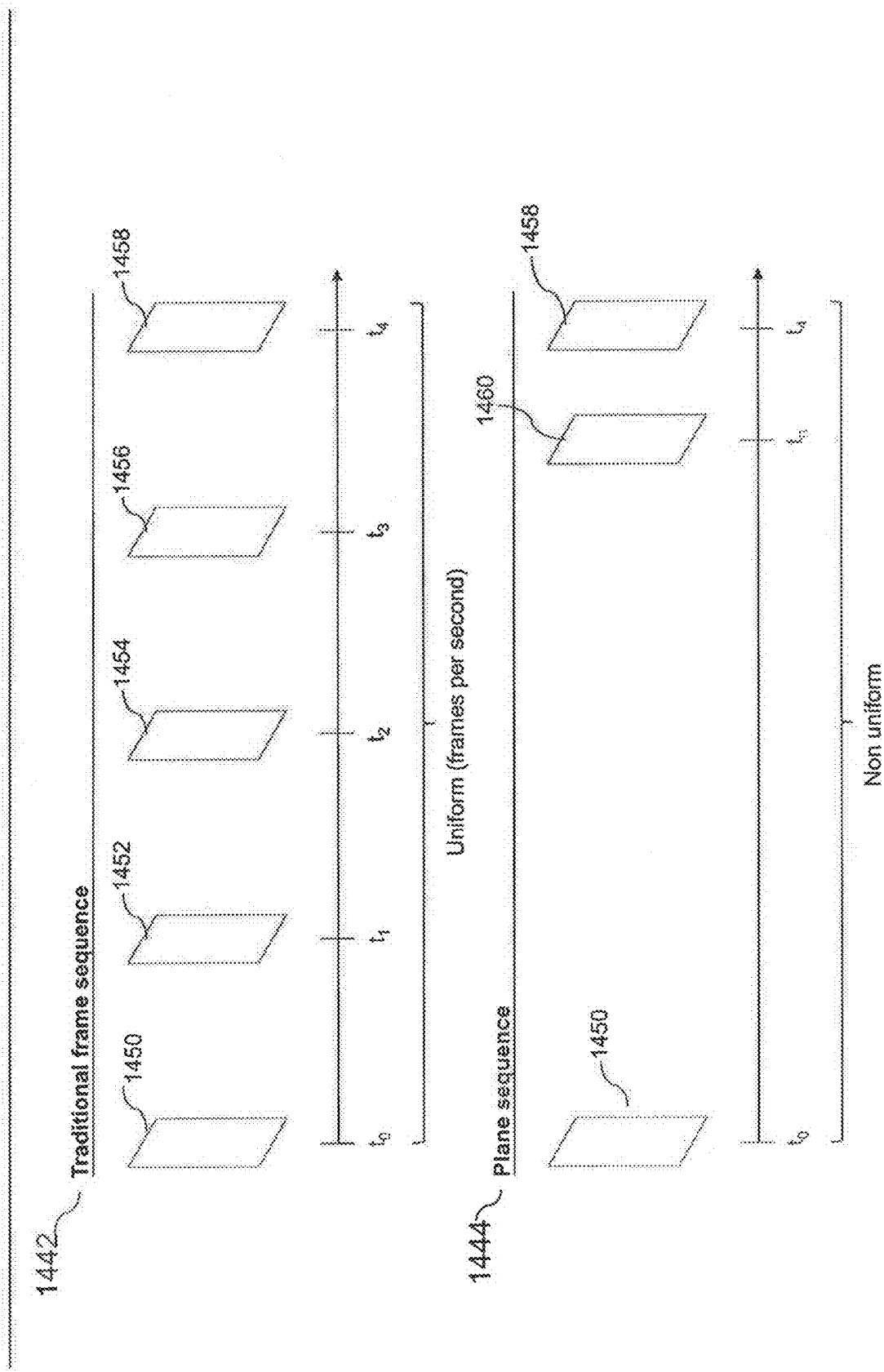

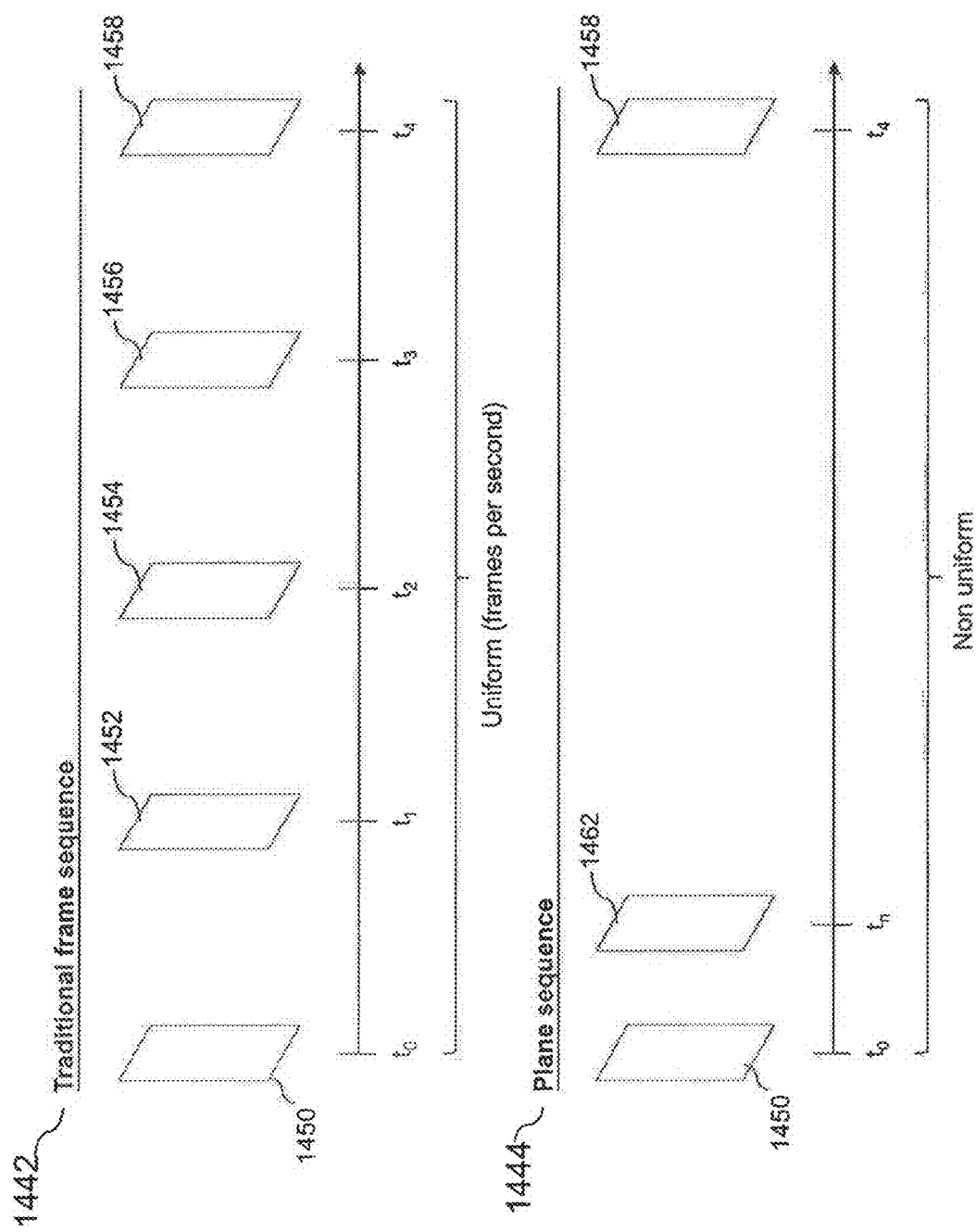

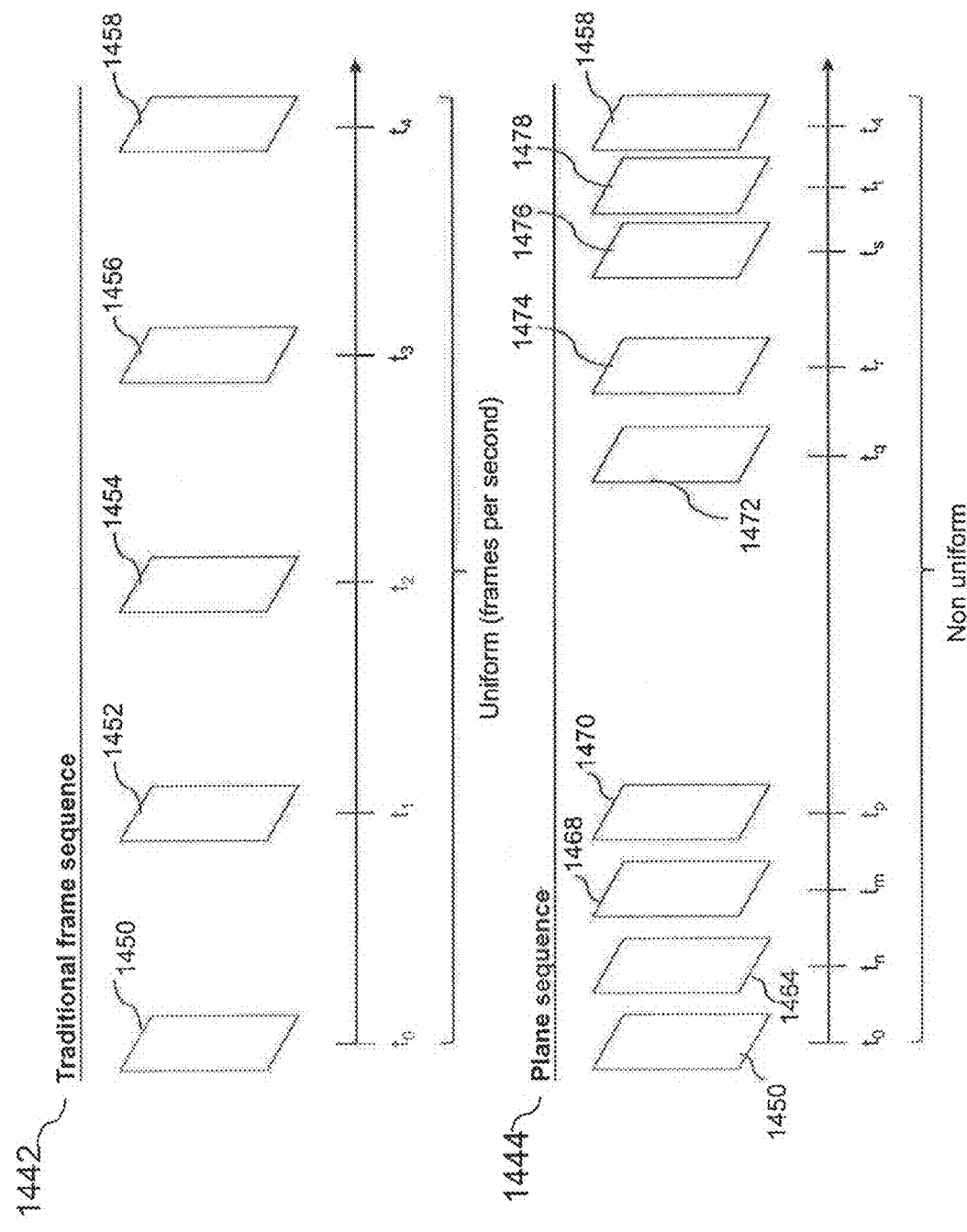

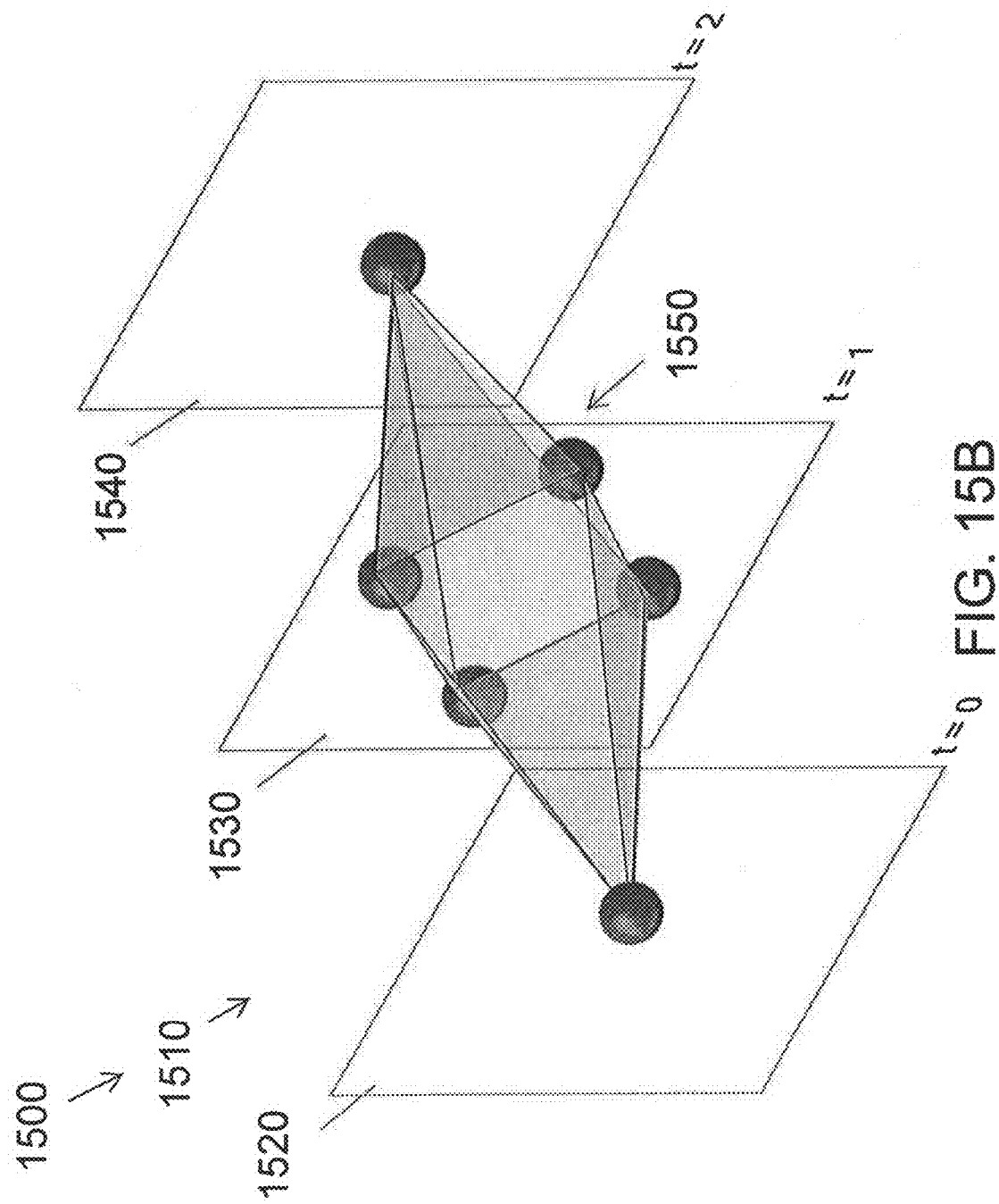

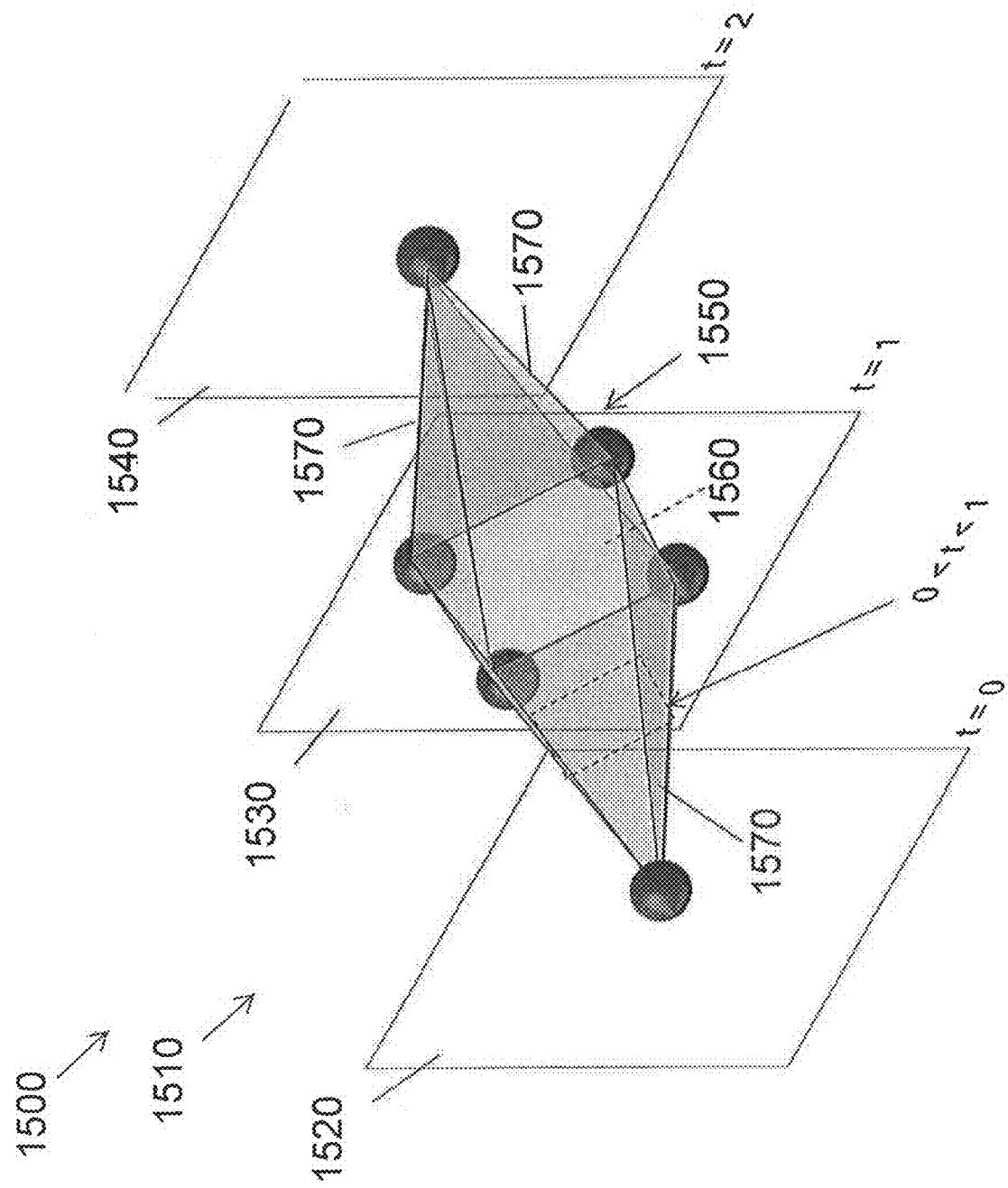

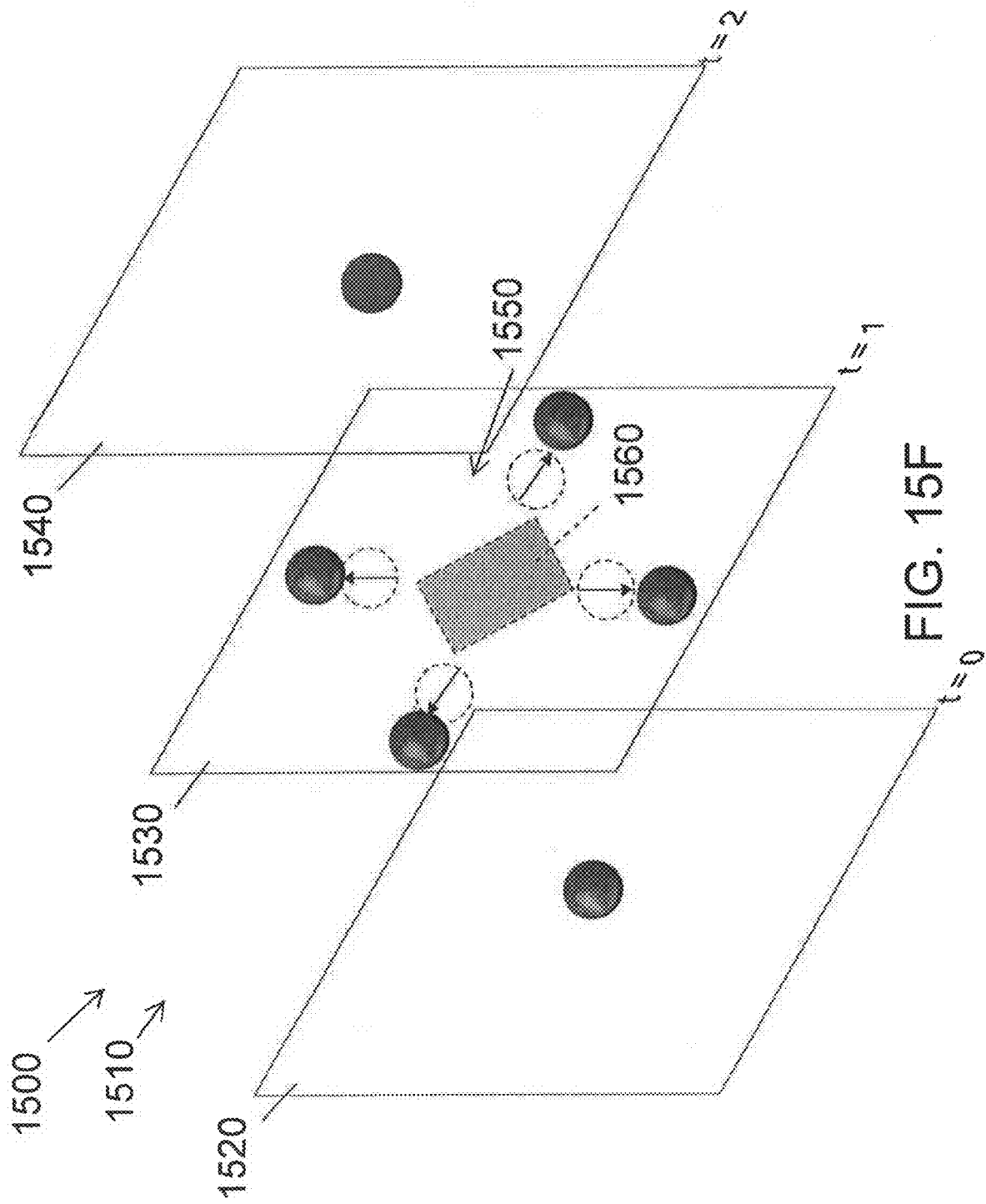

SYSTEM AND METHOD FOR NON-UNIFORM VIDEO CODING

CROSS-REFERENCE TO RELATED APPLICATIONS

This application is a continuation of U.S. patent application Ser. No. 16/238,822, filed on Jan. 3, 2019, which is a continuation of U.S. patent application Ser. No. 14/218,073, filed on Mar. 18, 2014, now U.S. Pat. No. 10,205,962, issued on Feb. 12, 2019, which claims priority to U.S. Provisional Application No. 61/790,808, filed on Mar. 15, 2013, the entire disclosure of which is incorporated by reference.

BACKGROUND

Video compression is utilized for the transmission and display of video data over a variety of media. Due to uncompressed video data being too large and requiring too much bandwidth for timely transmission and display, video must be compressed in order to be displayed in real time. The video data may be compressed in any of a variety of manners, and different techniques have been utilized for different platforms.

A known manner of video compression is linear, frame-based video compression. This type of video compression is built on the minimizing the amount of data that is needed to reconstruct successive frames. However, such methodologies are highly dependent on predetermined bit rate and resolution constraints. Other video compression techniques utilize optical flow to estimate motion in video data and compressive sampling to reconstruct signals based on data measured at intervals and data assumptions made at non-measured intervals. Further video compression techniques utilize prediction vectors that go beyond traditional frame data, for example using subpixel reconstruction. However, such techniques are inherently reliant on frame data.

With linear, frame-based video compression, a group of pictures forming video data may be grouped, categorized and transmitted. A typical group of pictures has a structure of IBBPBBP, where I frames are intra-coded data, P frames are predictive data, and B frames are bi-predictive data. In such methods, an I frame may represent full data of a frame and is utilized to predict both P and B frames. The P frame is formed entirely from the I frame and, when interpreted with the I frame, is utilized to predict B frames This known linear, frame-based video compression methodology, however, has problems. Current linear, frame-based video compression methodology may be problematic if any video sequences need to be edited. Also, the editing may require a lot more computer power to carryout. In an IBBPBBP structure, the fourth frame, a P frame, is needed in order to predict the second and third frames, the B frames. Thus, when the compressed video data is transmitted, the P frame is transmitted before the two B frames and, when the video data is uncompressed, it must be reordered so that the B frames are properly displayed before the P frame. As a result, there is a delay in the transmission, decoding and display of video data compressed in this manner. Additionally, due to the wide variety of viewing platforms and screen resolutions, data transmission speeds, and viewing devices, it is inefficient to utilize existing compression techniques. This may also require a lot of computing power to utilize existing compression techniques which may be computationally intensive.

SUMMARY OF THE INVENTION

A method and system for video coding by integrating frame data and time data may be shown and described. The method and system can include a video coding non-transitory storage media that integrates reference data and time data. More specifically, the video coding non-transitory storage media can produce one or more luma vectors and one or more chroma vectors within a video plane, the one or more luma vectors and one or more chroma vectors may be extended into time vectors that can be utilized for compression or reconstruction of the frame rate, define luma vector across time as a contiguous function and perform video compression across a time dimension.

BRIEF DESCRIPTION OF THE DRAWINGS

Advantages of embodiments of the present invention will be apparent from the following detailed description of the exemplary embodiments thereof, which description should be considered in conjunction with the accompanying drawings in which like numerals indicate like elements, in which:

FIG. 9A is an exemplary diagram showing an exemplary technique for luma compression over time.

FIG. 10A is an exemplary diagram showing an exemplary technique for chroma compression over time.

FIG. 14B is an exemplary diagram showing a traditional frame sequence with a non-uniform video plane sequence.

FIG. 14C is another exemplary diagram showing a traditional frame sequence with a non-uniform video plane sequence.

FIG. 14D is still another exemplary diagram showing a traditional frame sequence with a non-uniform video plane sequence.

FIG. 15B is an exemplary diagram showing a three dimensional luma vector with an octahedron space.

FIG. 15C is an exemplary diagram showing a three dimensional luma vector with an octahedron space with a slice interpolated.

FIG. 15F is an exemplary diagram showing an increased resolution of a three dimensional luma vector with an octahedron space with a slice interpolated.

DETAILED DESCRIPTION

Figure 1:
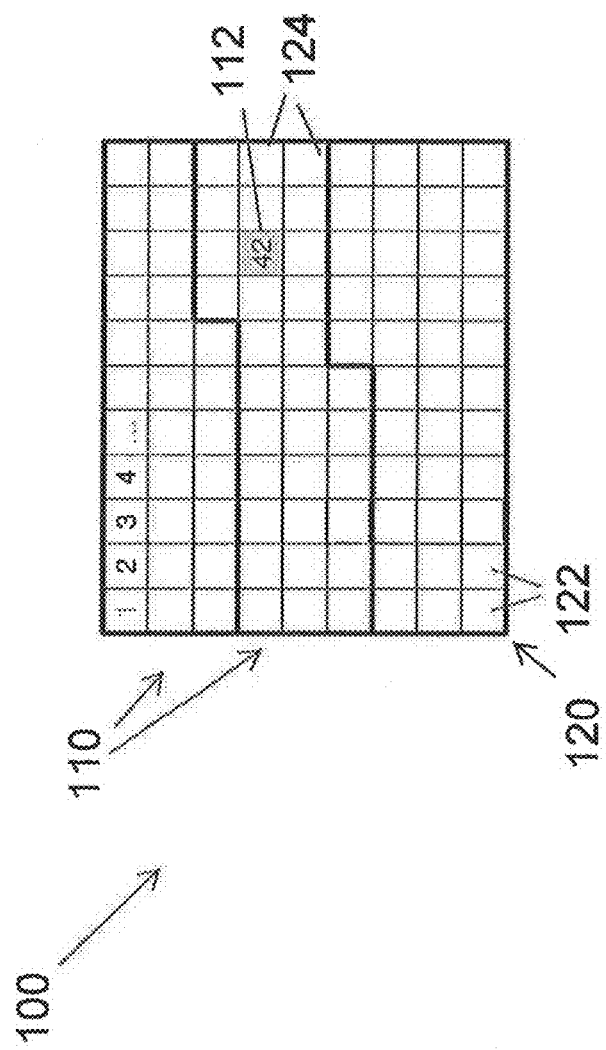
FIG. 1 is an exemplary diagram showing a video frame.

Aspects of the present invention are disclosed in the following description and related figures directed to specific embodiments of the invention. Those skilled in the art will recognize that alternate embodiments can be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage media such that execution of the sequence of actions enables the processor to perform the functionality described herein. Thus, the various aspects of the present invention can be embodied in a number of different forms, all of which have been contemplated to be within the scope of the claimed subject matter. In addition, for each of the embodiments described herein, the corresponding form of any such embodiments can be described herein as, for example, "a computer configured to" perform the described action.

Further as used herein, terms such as slice, picture and frame may be utilized interchangeably, even in situations where a frame or picture may be coded with multiple slices and/or slices of different types. Additionally, the term picture may be interpreted as a generic term that could define either a frame or a field.

H.264/MPEG-4 Advanced Video Coding standard (H.264/AVC), as well as other video coding standards utilized on various platforms at various times (H.264/AVC) are known and commonly utilized standards for video compression. H.264/AVC was developed due to ongoing needs for greater compression of moving pictures for various applications such as videoconferencing, digital storage media, television broadcasting, Internet streaming, and a variety of other forms of communication that utilize video. It may also be utilized to allow for the utilization of the coded video representation in a flexible manner for a wide variety of network environments.

H.264/AVC, and the like, have been utilized to offer greater degrees of video compression and may provide greater flexibility in compressing, transmitting, and storing video. The high coding efficiency of H.264/AVC, in particular, gives perceptually equivalent video quality at a lower bitrate than earlier video coding standards such as Motion Picture Experts Group 2 or MPEG-2, or other previous standards or techniques. Thus, the documents establishing the H.264/AVC standard are hereby incorporated by reference in their entirety, including "Advanced Video Coding for Generic Audiovisual Services" on March 2005 (ITU-T Rec. H.264 and ISO/IEC 14496-10). As the H.264/AVC standard is known in the art, the present specification will not attempt to document all the existing aspects of H.264/AVC, relying instead on a combination of establishing new exemplary embodiments and techniques that may provide for more efficient compression than the H.264/AVC standard, while utilizing some of the building blocks of that, and previous video compression standards and techniques, as follows.

FIG. 1 is an exemplary diagram showing a video frame 100. The video frame 100 may include one or more slices 110 and macroblocks 120. The one or more slices 110 may be self-contained. The macroblocks 120 may be a basic syntax and processing unit. The macroblocks 120 and may include luma samples 122 such as approximately 16×16 Y luma samples and the like. The macroblocks 120 may include color chroma samples 124 such as approximately 2×(8×8) samples and the like. The macroblocks 120 and may be arranged in a sequence to form the one or more slices 110. The macroblocks 120 may be disposed within one of the one or more slices 110 and may depend on each other. The macroblocks 120 may also be further partitioned. FIG. 1 illustrates slice 1, macroblock 112. Current video compression techniques such as H.264 may partition a picture into the one or more slices 110 and the macroblocks 120 for encoding.

As shown in exemplary FIG. 1, aspects of a video compression method and system may be shown. In this and other exemplary embodiments, various aspects of other video compression techniques and algorithms may be utilized for temporal or time-based, non-linear video compression. However, components and aspects of linear, frame-based video compression, such as H.264 and MPEG2, may be utilized, in an exemplary fashion, to introduce the novelty of time-based, non-linear video compression, as discussed below. Additionally, in still further exemplary embodiments, some known aspects of B-frame motion vectors, run length coding, temporal direct prediction, SKIP mode modification, as introduced to the H.264 standard, Motion Copy SKIP mode in H.264, and spatial direct mode in H.264 may be utilized in the further exemplary embodiments. Thus, in one exemplary embodiment, after video data is generated, a picture or frame of data may be formed as one or more slices. Each slice may then include one or more macroblocks. A macroblock may include approximate 16×16 Y (luma) samples and approximate 2×(8×8) color (chroma) samples. Macroblocks within a slice may be dependent on each other and may, in some exemplary embodiments, be further partitioned.

Still referring to exemplary FIG. 1, each macroblock may be an image compression component based on discrete cosine transform (DCT) utilized on video frames and the blocks may often include two or more blocks of pixels. The size of macroblocks may vary, although, for this exemplary embodiment, it may be assumed that a block may have a fixed size of approximate 8×8 pixels. This may include four Y blocks, one Cb block and one Cr block, which may in turn define an approximate 16×16 pixel square of YCbCr 4:2:0.

Color information in a macroblock is often encoded at a lower resolution than the luminance information. For example, color information (chroma) of an approximate 8×8 macroblock in an approximate 4:1:1 color vector may be encoded into a Y Cb Cr format. The luminance (luma) may then be encoded at an approximately 8×8 pixel size and the difference-red and difference-blue information each at a size of approximate 2×2. In a decode process, these may be stretched out to cover the approximate 8×8 vector.

As discussed above, each macroblock may contain 4 Y (luminance) blocks, 1 Cb (blue color difference) block, 1 Cr (red color difference) block, forming an approximate 4:2:0 vector. Also, it may be noted that macroblocks may be subdivided further into smaller blocks, called partitions, and block sizes may be as small as approximate 4×4.

Figure 2:
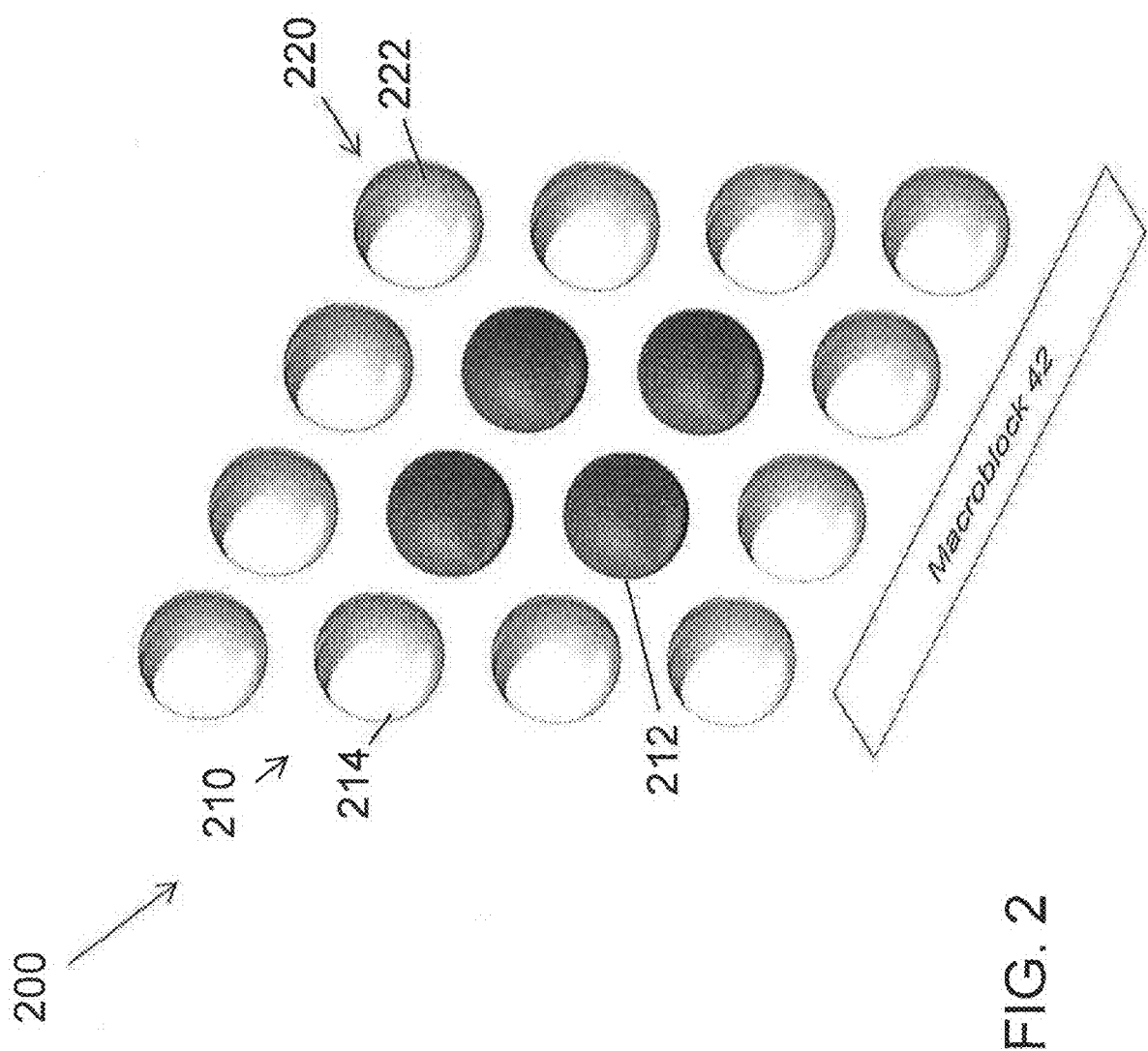
FIG. 2 is an exemplary diagram showing a macroblock.

FIG. 2 is an exemplary diagram showing a macroblock 200. The macroblock 200 may be a basic unit of syntax in video compression. The macroblock 200 may include pixels 210 and lines 220. The pixels 210 may include one or more pixel value black pixels 212, one or more pixel value white pixels 214 and the like. The lines 220 may include an active line 222 and the like.

As shown in exemplary FIG. 2, slice 1 macroblock 42 (as shown in FIG. 1), may be shown in an approximate 4×4 pixel arrangement. In this example the block is shown having pixel value black (YCbCr=16, 128, 128) and the remaining pixel value white (YCbCr=180, 128, 128). In some known prior art, such as the MPEG2 sampling shown in exemplary FIG. 3, luma and chroma data may be sampled at different rates. In this figure, there may be a progressive scan of macroblock 42 with approximate 4:2:0 MPEG2 sampling. Here, it may be seen that the frame represents the calculated CbCr sample and a sphere represents the Y sample. Additionally, Cb and Cr channels may be subsampled horizontally (as in 4:2:2) and vertically. This may reduce color resolution in both the horizontal and vertical dimensions compared to approximate 4:2:2, which may only reduce horizontal chroma resolution.

It may be noted that each macroblock may be partitioned, as desired, for use with inter prediction-type compression techniques. The selection of the size of inter prediction partitions may be a result of a trade-off between the coding gain provided by utilizing motion compensation with smaller blocks and the quantity of data needed to represent the data for motion compensation. Further, the inter prediction process may form segmentations for motion representation as small as approximate 4×4 luma samples in size, utilizing motion vector accuracy of one-quarter of the luma sample grid spacing displacement. The process for inter prediction of a sample block may also involve the selection of the picture to be utilized as the reference picture from a number of stored previously-decoded pictures. Motion vectors may be encoded differentially with respect to predicted values formed from nearby encoded motion vectors. Typically, the encoder may calculate appropriate motion vectors and other data elements represented in the video data stream. Additionally, some techniques can utilize motion vectors that go beyond frame data in using subpixel reconstruction. In such methodologies, motion vectors that resolve to 1/n subpixels can be utilized. Such techniques may be further utilized in the following exemplary embodiments without reliance on frame data.

Figure 3:
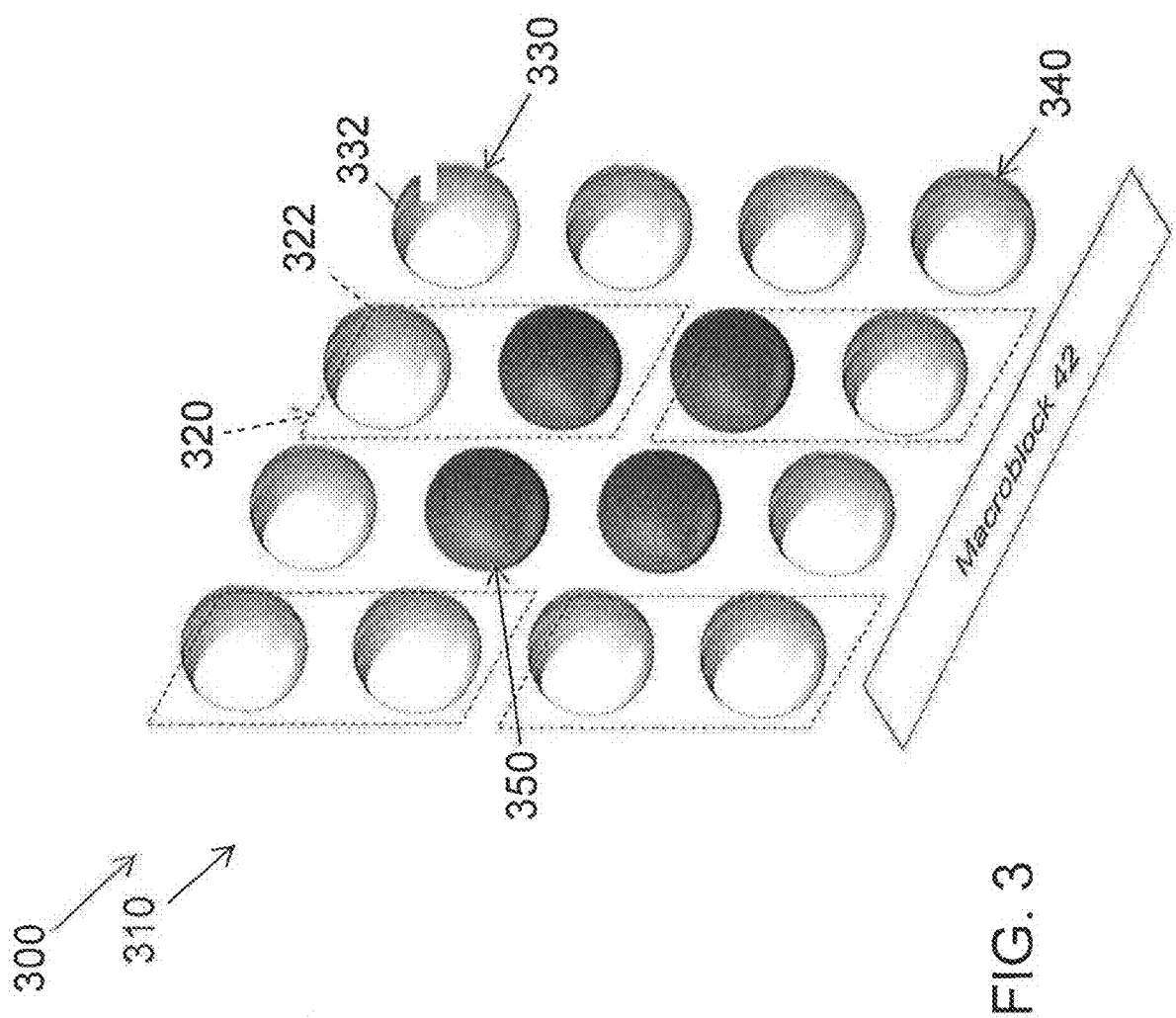
FIG. 3 is an exemplary diagram showing a macroblock utilized in sampling.

FIG. 3 is an exemplary diagram showing a macroblock 300 utilized in sampling. FIG. 3 illustrates an approximate 4:2:0 macroblock MPEG2 sampling 310 that may demonstrate how luma and chroma are sampled at different rates. The macroblock 300 may also include a frame 320, a sphere 330, CB channels 340 and CR channels 350. The macroblock MPEG2 sampling 310 may be approximately 12-bits, to be confirmed sampling and the like. The frame 320 may represent a calculated CbCr sample 322 and the like. The sphere 330 may represent a Y sample 332 and the like. The CB channels 340 may be subsampled both horizontally and vertically to reduce color solution in both the horizontally and vertically dimensions. This is in contrast to an approximate 4:2:2 sampling which only reduce horizontal chroma resolution. The CR channels 350 may also be subsampled both horizontally and vertically to reduce color solution in both the horizontally and vertically dimensions. This is in contrast to an approximate 4:2:2 sampling which only reduce horizontal chroma resolution.

Figure 4:
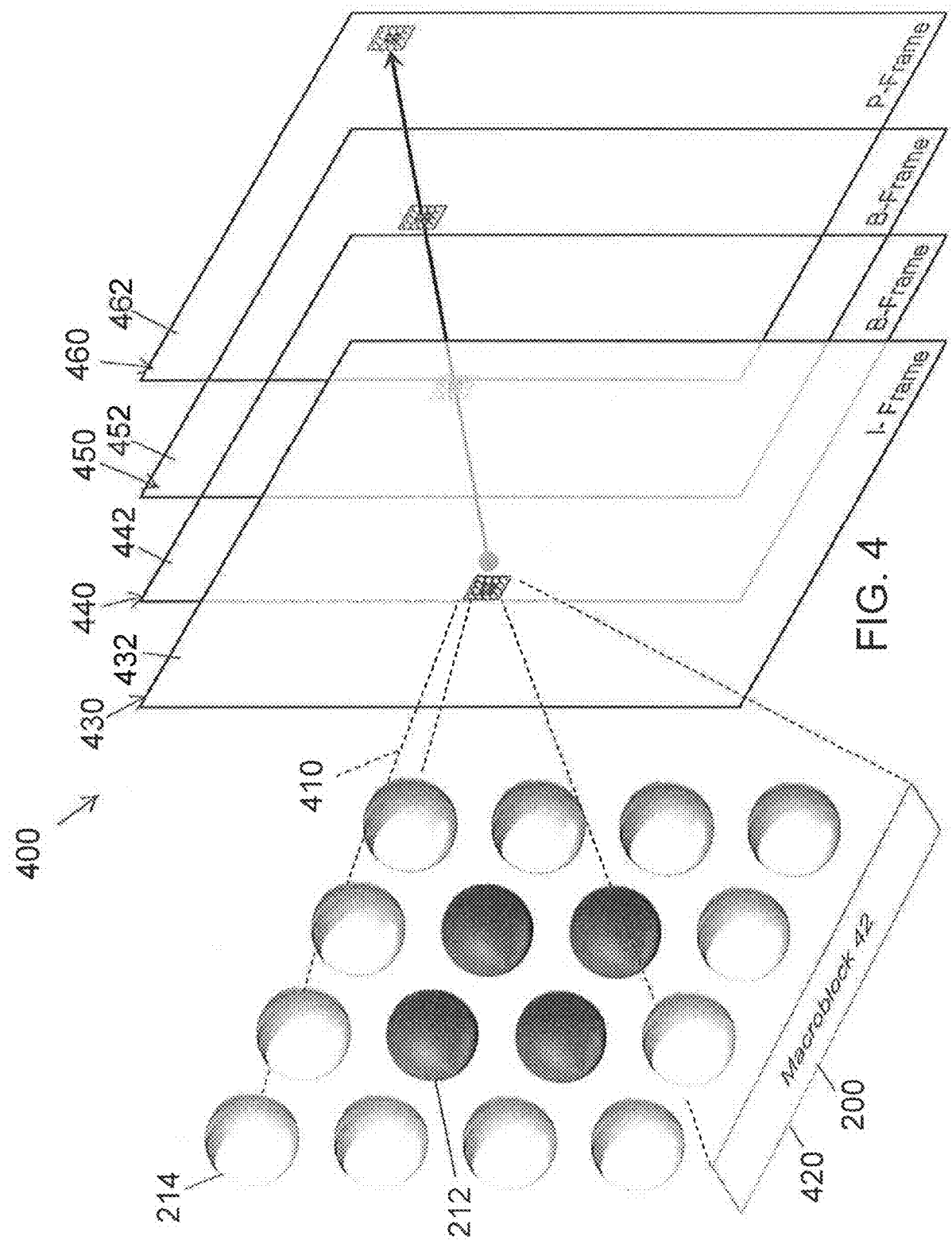
FIG. 4 is an exemplary diagram showing macroblock position changes between frames.

FIG. 4 is an exemplary diagram showing macroblock position changes between frames 400. The frames 400 may include a motion vector 410, a macroblock 420, a first frame 430, a second frame 440, a third frame 450 and a fourth frame 460. FIG. 4 illustrates four frames however any number of frames may be utilized and the like. The motion vector 410 may define how the macroblock position changes between frames and may also provide information on one or more deltas in luma or chroma values. The macroblock 420 utilized in FIG. 4 may include a macroblock 200 (as shown in FIG. 2) with one or more pixel value black pixels 212, one or more pixel value white pixels 214 and the like. The first frame 430 may be an I-frame 432 and the like. The second frame 440 may be a first B-frame 442 and the like. The third frame 450 may be a second B-frame 452 and the like. The fourth frame 460 may be a P-frame 462 and the like. The frames 400 may also be in any order, arrangement or orientation and the like.

Exemplary FIG. 4 builds on the known method of FIG. 3. Here a motion vector may define how the macroblock position changes between frames. Additionally, the vector may provide information on any changes in luma or chroma values. Thus, in exemplary FIG. 4, macroblock 42 is transmitted directly as an I frame, with all of the relevant luma and chroma data therein. The P and B frames may then be predicted based on the I frame data, as discussed above. As such, less information may be transmitted as only the full data of the I frame is known and utilized to predict each of the later frames. This is further reflected in exemplary FIGS. 5 and 6. However, in this example, the P frame and B frames are duplicate data from the I frame (i.e. the video data has not changed for those frames). Therefore, as the luma and chroma values have not changed, only the original I frame data is stored, along with the motion vector data. In such a situation, there is substantially zero loss and minimal or no decoding artifacts in the displayed video.

Figure 5:
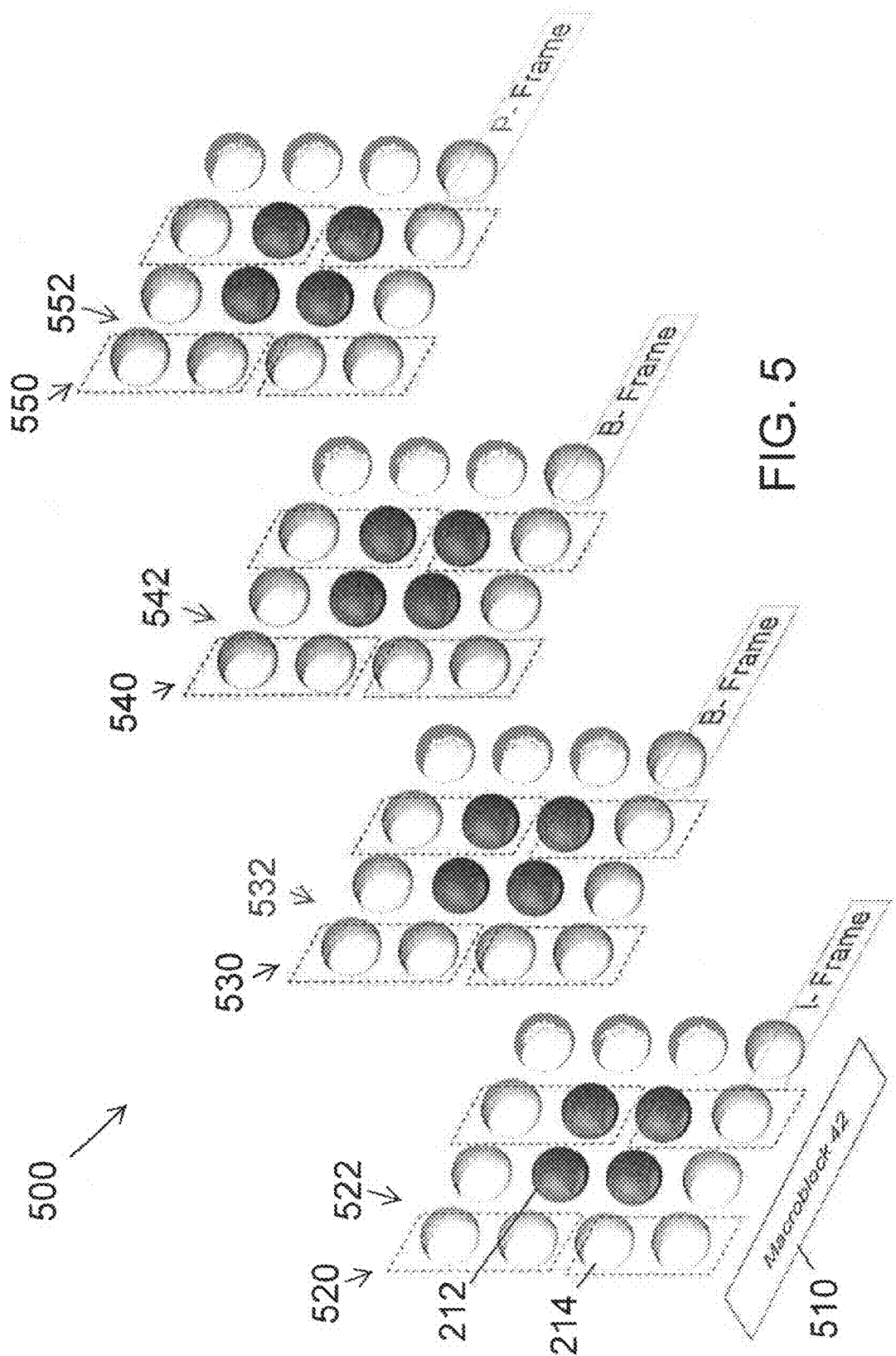
FIG. 5 is an exemplary diagram showing various frames of macroblock data utilized in a compression technique.

FIG. 5 is an exemplary diagram showing various frames 500 of macroblock data utilized in a compression technique. The compression technique may be MPEG2 compression, MPEG4 compression and the like. The MPEG2 compression and MPEG4 compression may rely on limiting an amount of information needed to reconstruct successive frames. The frames 500 may include a macroblock 510, a first frame 520, a second frame 530, a third frame 540 and a fourth frame 550. The macroblock 510 may be a macroblock 200 (as shown in FIG. 2) with one or more pixel value black pixels 212, one or more pixel value white pixels 214 and the like. The first frame 520 may be an I-frame 522 and the like. The second frame 530 may be a first B-frame 532 and the like. The third frame 540 may be a second B-frame 542 and the like. The fourth frame 550 may be a P-frame 552 and the like. The frames 500 may also be in any order, arrangement or orientation and the like.

However, it is possible to further improve video compression, encoding and decoding. For example, a video compression technique that is both bit rate and resolution independent may be performed. Such a technique may be realized by minimizing luma and chroma information across time, and not discretely between frames.

Figure 7:
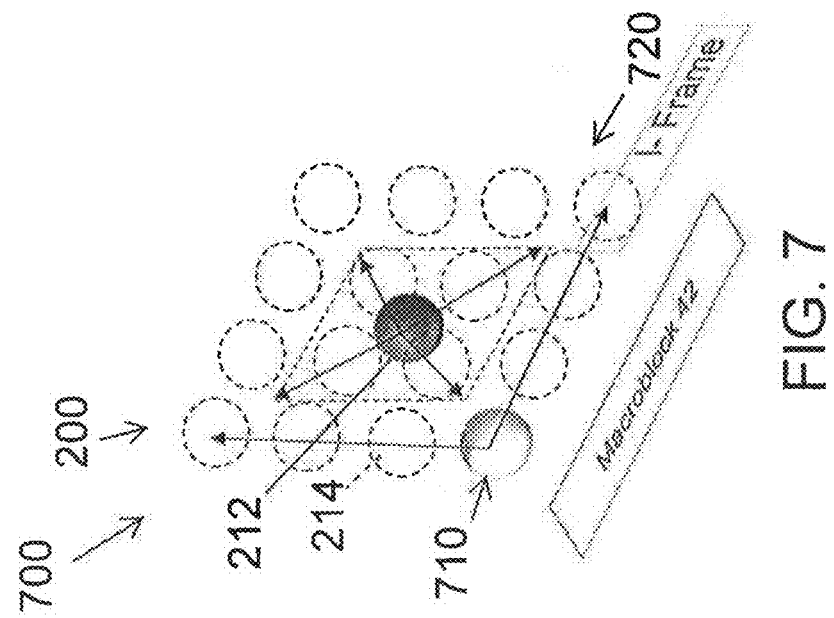
FIG. 7 is an exemplary diagram showing an exemplary technique for luma compression in a macroblock.

FIG. 7 is an exemplary diagram showing an exemplary technique for luma compression in a macroblock 700. The macroblock 700 may include a video compression technique which may be bit-rate and resolution dependent by minimizing luma and chroma information across time, not discretely between frames. The macroblock 700 may be a macroblock 200 (as shown in FIG. 2) with one or more pixel value black pixels 212, one or more pixel value white pixels 214 and the like. The macroblock 700 may include a base block 710 and an I-frame 720. The luma compression may be vector based within the base block 710, which may have the highest resolution source material. The macroblock 700 as introduced previously (as shown in FIG. 2), may be shown and may utilize luma compression as vector based within an I frame 720. In exemplary FIG. 7, an example of non-linear compression for luma data may be shown. Here, the same macroblock as introduced previously (as shown in FIG. 2), may be shown and may utilize luma compression as vector based within an I frame, as it has the highest resolution of source material.

Figure 8:
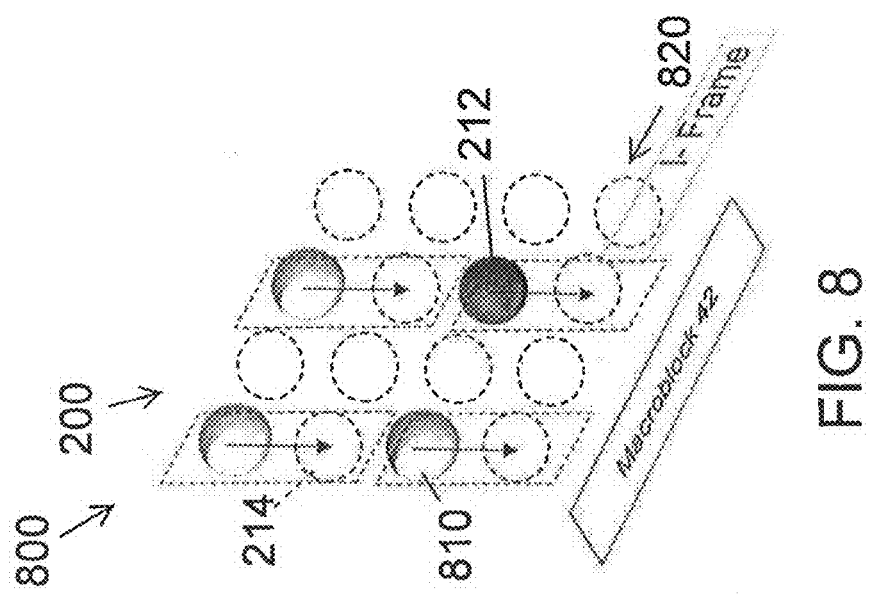
FIG. 8 is an exemplary diagram showing an exemplary technique for chroma compression in a macroblock.

FIG. 8 is an exemplary diagram showing an exemplary technique for chroma compression in a macroblock 800. The macroblock 800 may include a video compression technique which may be bit-rate and resolution dependent by minimizing luma and chroma information across time, not discretely between frames. The macroblock 800 may be a macroblock 200 (as shown in FIG. 2) with one or more pixel value black pixels 212, one or more pixel value white pixels 214 and the like. The macroblock 800 may include a base block 810 and an I-frame 820. The luma compression may be vector based within the base block 810, which may have the highest resolution source material. The macroblock 800 as introduced previously (as shown in FIG. 2), may be shown and may utilize luma compression as vector based within the I frame 820. Here, the same macroblock as introduced previously (as shown in FIG. 2), may be shown and may utilize luma compression as vector based within the I frame 820, as it has the highest resolution of source material. Similarly, as shown in exemplary FIG. 8, chroma data compression may also be vector based within an I frame.

FIG. 9A is an exemplary diagram showing an exemplary technique for luma compression 900 over time. FIG. 9A may include a macroblock 910, one or more luma values 920 and one or more luma vectors 930. The macroblock 910 may be any type of macroblock and the like. The one or more luma values 920 may extend into a time dimension. The one or more luma vectors 930 may extend from the macroblock 910. Bit rate independence may be achieved by interpolating the one or more luma values 920 at any point in time dimension along known one or more luma vectors 930.

Figure 9B:
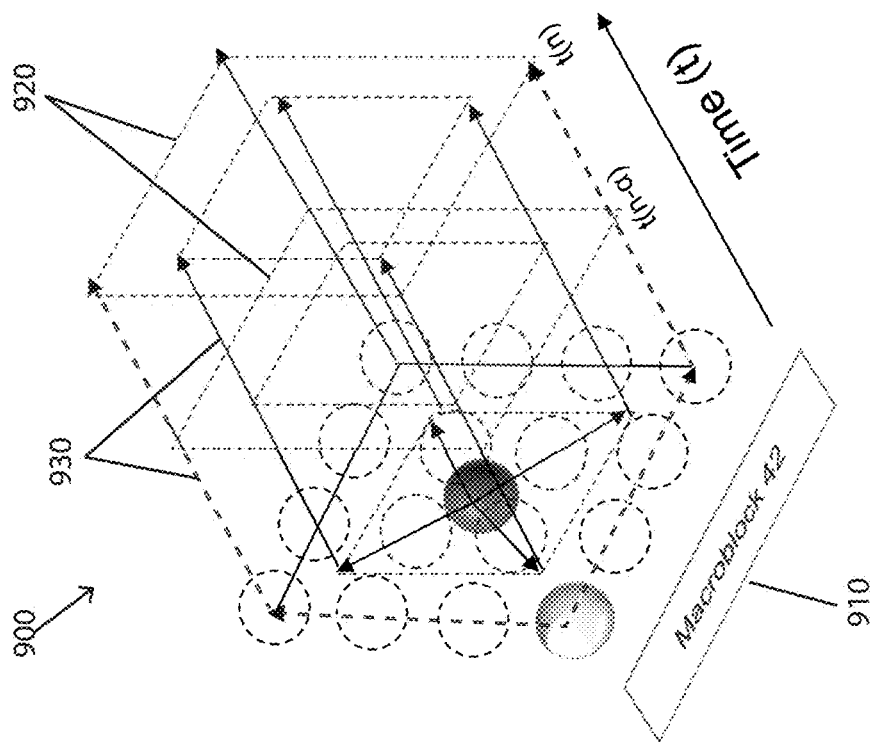
FIG. 9B is an exemplary diagram showing an exemplary technique for luma compression over time.

FIG. 9B is an exemplary diagram showing an exemplary technique for luma compression 900 over time. FIG. 9B may include a macroblock 910, one or more luma values 920 and one or more luma vectors 930. The macroblock 910 may be any type of macroblock and the like. The one or more luma values 920 may extend into a time dimension. FIG. 9B shows two luma values 920 however the luma compression 900 may be any number of luma values. The one or more luma vectors 930 may extend from the macroblock 910. Bit rate independence may be achieved by interpolating the one or more luma values 920 at any point in time dimension along known one or more luma vectors 930.

FIG. 10A is an exemplary diagram showing an exemplary technique for chroma compression 1000 over time. FIG. 10A may include a macroblock 1010, one or more chroma values 1020 and one or more chroma vectors 1030. The macroblock 1010 may be any type of macroblock and the like. The one or more chroma values 1020 may extend into a time dimension. The one or more chroma vectors 1020 may extend from the macroblock 1010. Bit rate independence may be achieved by interpolating the one or more chroma values 1020 at any point in time dimension along known one or more chroma vectors 1030. The one or more chroma vectors 1030 may imply the chroma compression 1000 over time.

Figure 10B:
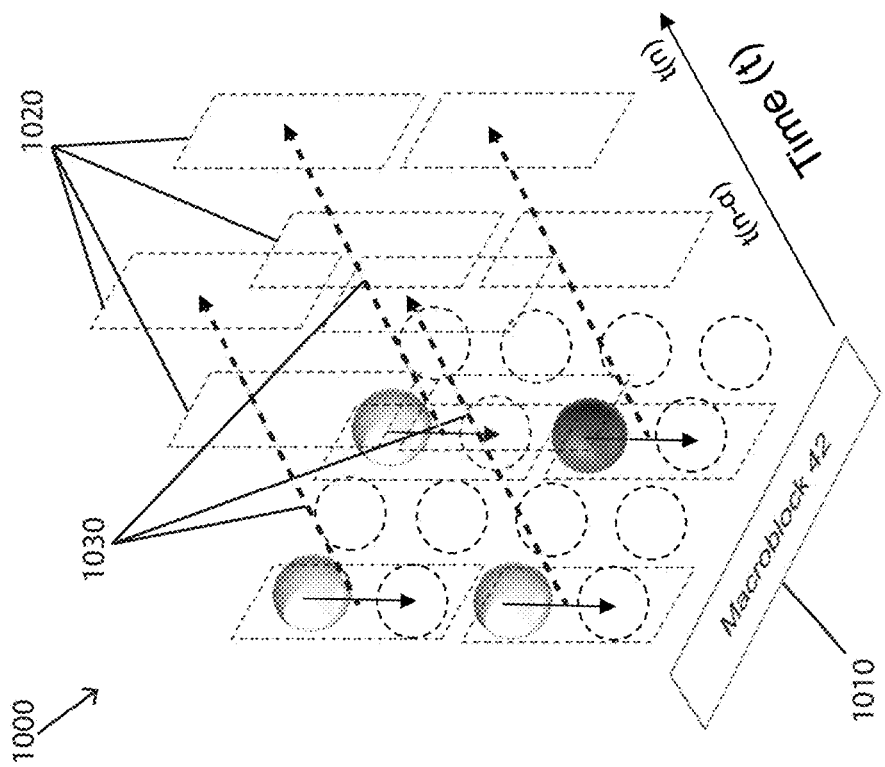
FIG. 10B is an exemplary diagram showing an exemplary technique for chroma compression over time.

FIG. 10B is an exemplary diagram showing an exemplary technique for chroma compression 1000 over time. FIG. 10B may include a macroblock 1010, one or more chroma values 1020 and one or more chroma vectors 1030. The macroblock 1010 may be any type of macroblock and the like. The one or more chroma values 1020 may extend into a time dimension. The one or more chroma vectors 1020 may extend from the macroblock 1010. FIG. 10B shows eight chroma values 1020 however the chroma compression 1000 may be any number of chroma values. Bit rate independence may be achieved by interpolating the one or more chroma values 1020 at any point in time dimension along known one or more chroma vectors 1030.

Building on the previous example, FIGS. 9A and 10A show luma and chroma vectors, respectively. In exemplary FIG. 9A, the luma data is extended in the time (t) dimension and compression of this data may occur based on intervals of time. It may be appreciated that compression may be substantially predictive for the luma data, but that instead of a specific frame being designated, for example, as an I frame, a time or times, t=0 through t=n, may be chosen and vector data utilized in compressing the data. Then, utilizing data from these times, luma data may be predicted for other times, such as t=n−α. Similarly, in exemplary FIG. 10A, chroma data may be seen as extended into the time (t) dimension. The chroma data may also be sampled at predetermined time intervals for use in compression, as desired.

Figure 11:
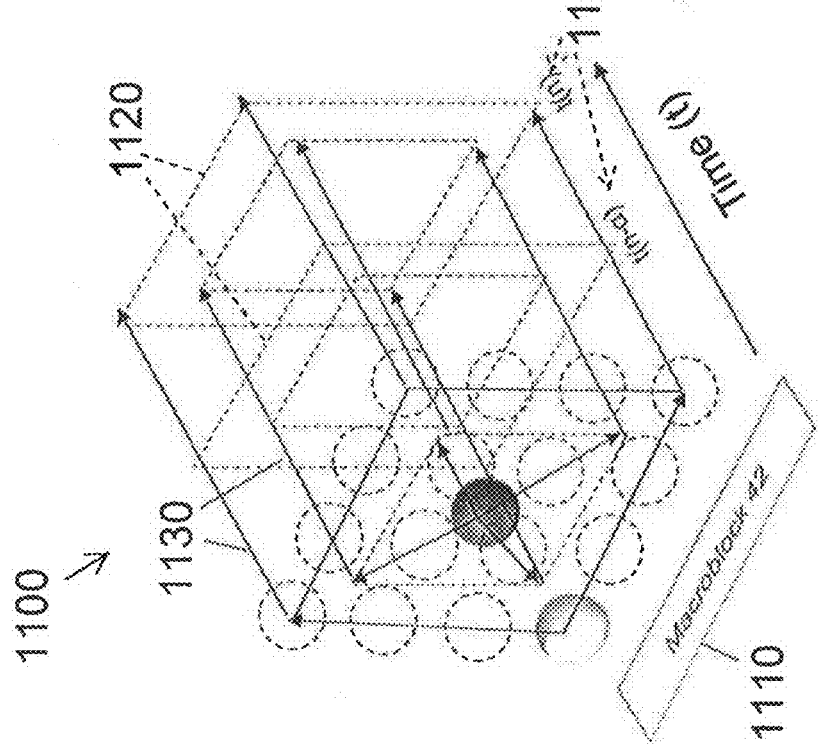
FIG. 11 is an exemplary diagram showing an exemplary technique for luma compression over time.

FIG. 11 is an exemplary diagram showing an exemplary technique for luma compression 1100 over time. FIG. 11 is an exemplary diagram showing an exemplary technique for luma compression over time. FIG. 11 may include a macroblock 1110, one or more luma values 1120, one or more luma vectors 1130 and one or more intermittent frames 1140. The macroblock 1110 may be any type of macroblock and the like. The one or more luma values 1120 may extend into a time dimension. The one or more luma vectors 1130 may extend from the macroblock 1110. Bit rate independence may be achieved by interpolating the one or more luma values 1120 at any point in time dimension along known one or more luma vectors 1130. The one or more intermittent frames 1140 may be referenced as t (n–α) on the time dimension of t (n).

This may be further shown in exemplary FIG. 11, where intermediate frames may be seen. On the time dimension of t (n), the intermediate frames may be referenced as t (n–α). A similar representation may be shown for chroma data in exemplary FIG. 12.

Figure 12:
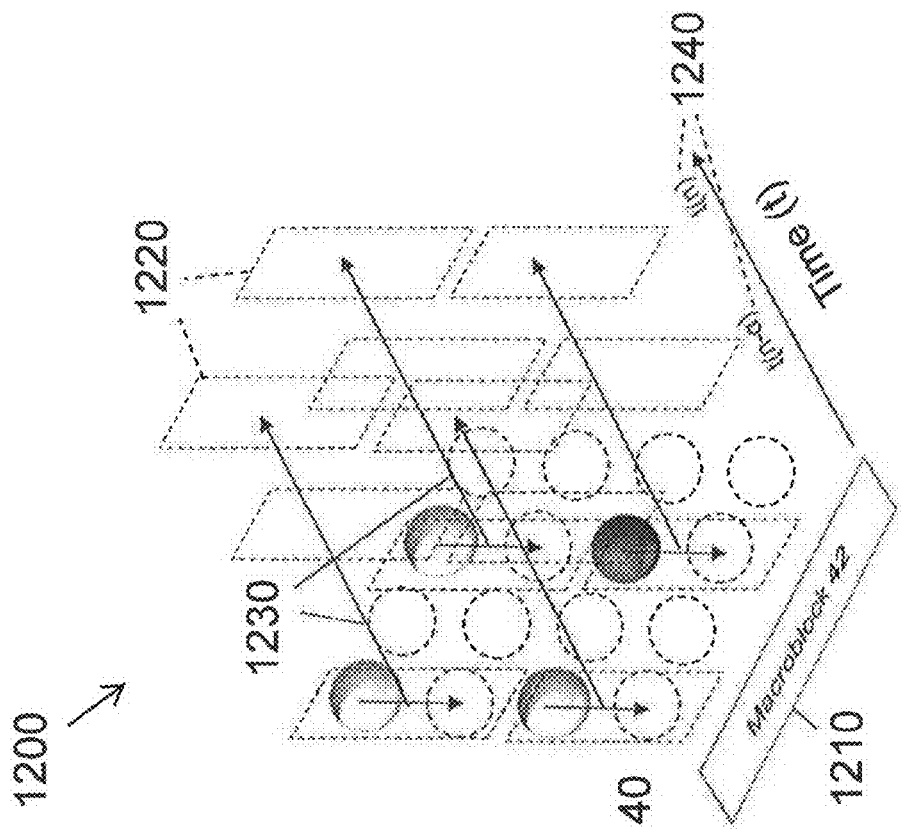
FIG. 12 is an exemplary diagram showing an exemplary technique for chroma compression over time.

FIG. 12 is an exemplary diagram showing an exemplary technique for chroma compression over time. FIG. 12 may include a macroblock 1210, one or more chroma values 1220, one or more chroma vectors 1230 and one or more intermittent frames 1240. The macroblock 1210 may be any type of macroblock and the like. The one or more chroma values 1220 may extend into a time dimension. The one or more chroma vectors 1230 may extend from the macroblock 1210. Bit rate independence may be achieved by interpolating the one or more chroma values 1220 at any point in time dimension along known one or more chroma vectors 1230. The one or more intermittent frames 1240 may be referenced as t (n–α) on the time dimension of t (n).

Additionally, it may be noted that, in some further exemplary embodiments, there may be a straightforward scaling of luma and chroma values in X and Y dimensions to accommodate higher and lower resolutions.

Figure 13:
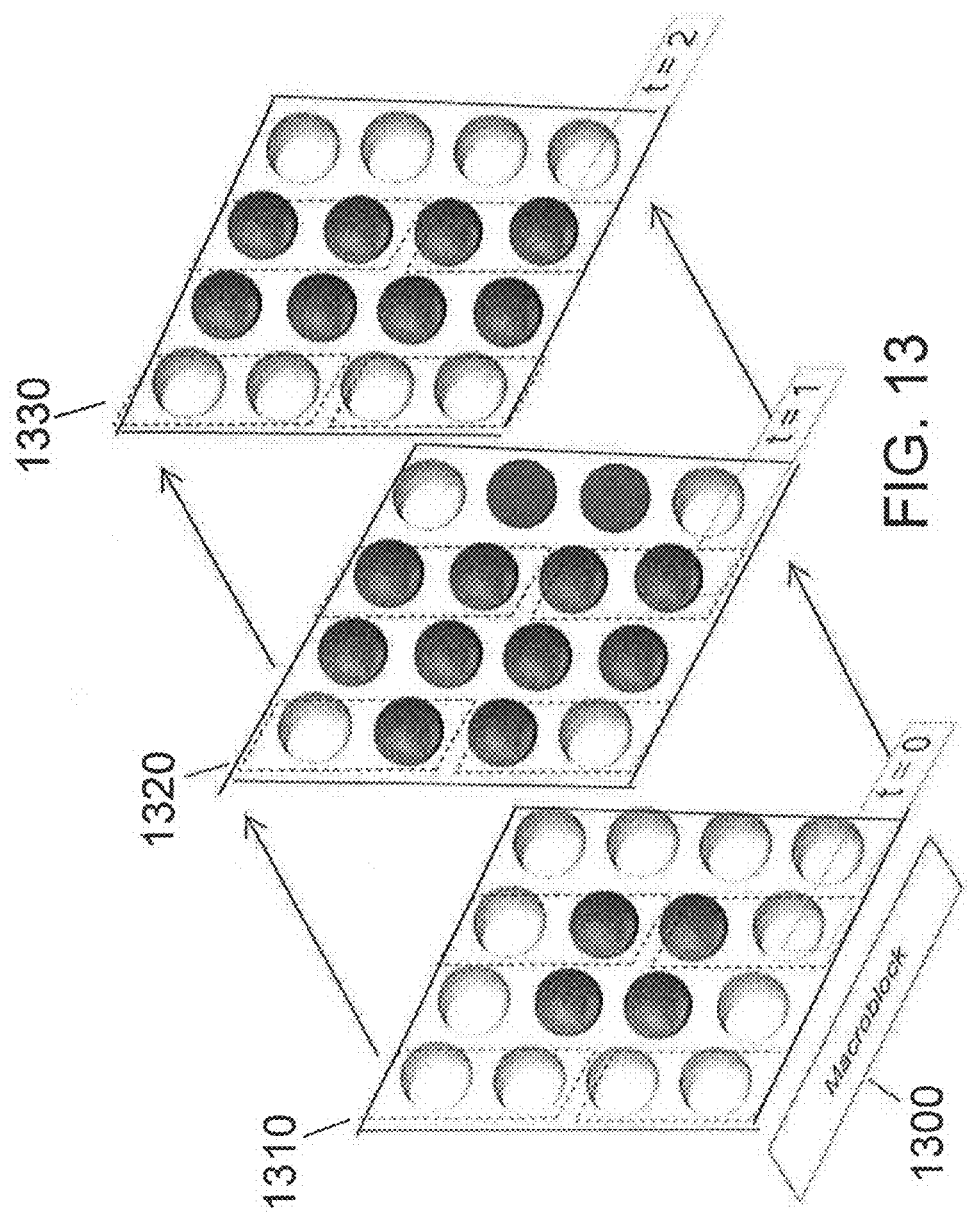
FIG. 13 is an exemplary diagram showing a dynamically resized floating macroblock over time.

FIG. 13 is an exemplary diagram showing a dynamically resized floating macroblock 1300 over time. The floating macroblock 1300 may be dynamically resized. FIG. 13 illustrates a first macroblock 1310, a second macroblock 1320 and a third macroblock 1330. The first macroblock 1310 may be at t=0 and the like. The second macroblock 1320 may be at t=1 and the like. The third macroblock 1330 may be at t=2 and the like. FIG. 13 illustrates the floating macroblock 1300 without a motion vector (not shown).

Exemplary FIG. 13 provides a graphical representation of an implementation of non-linear video compression by utilizing a floating macroblock that may be dynamically resized. Here, the macroblock is shown at three different times, t=0 (an initial frame, similar to an I frame), t=1, and t=2. It is further clear that there are variations in the macroblock at each time, which may then be compressed, encoded and decoded with greater efficiency and lower losses than other known methods.

FIG. 14 is an exemplary diagram showing a dynamically resized floating macroblock 1400 over time with luma information utilized in compression. The floating macroblock 1400 may be dynamically resized. FIG. 14 illustrates a first macroblock 1410, a second macroblock 1420 and a third macroblock 1430. The first macroblock 1410 may be at t=0 and the like. The second macroblock 1420 may be at t=1 and the like. The third macroblock 1430 may be at t=2 and the like. FIG. 14 illustrates the floating macroblock 1400 without a motion vector (not shown). Where contiguous best matching function cannot be defined, alternative vectors must be applied.

Figure 14A:
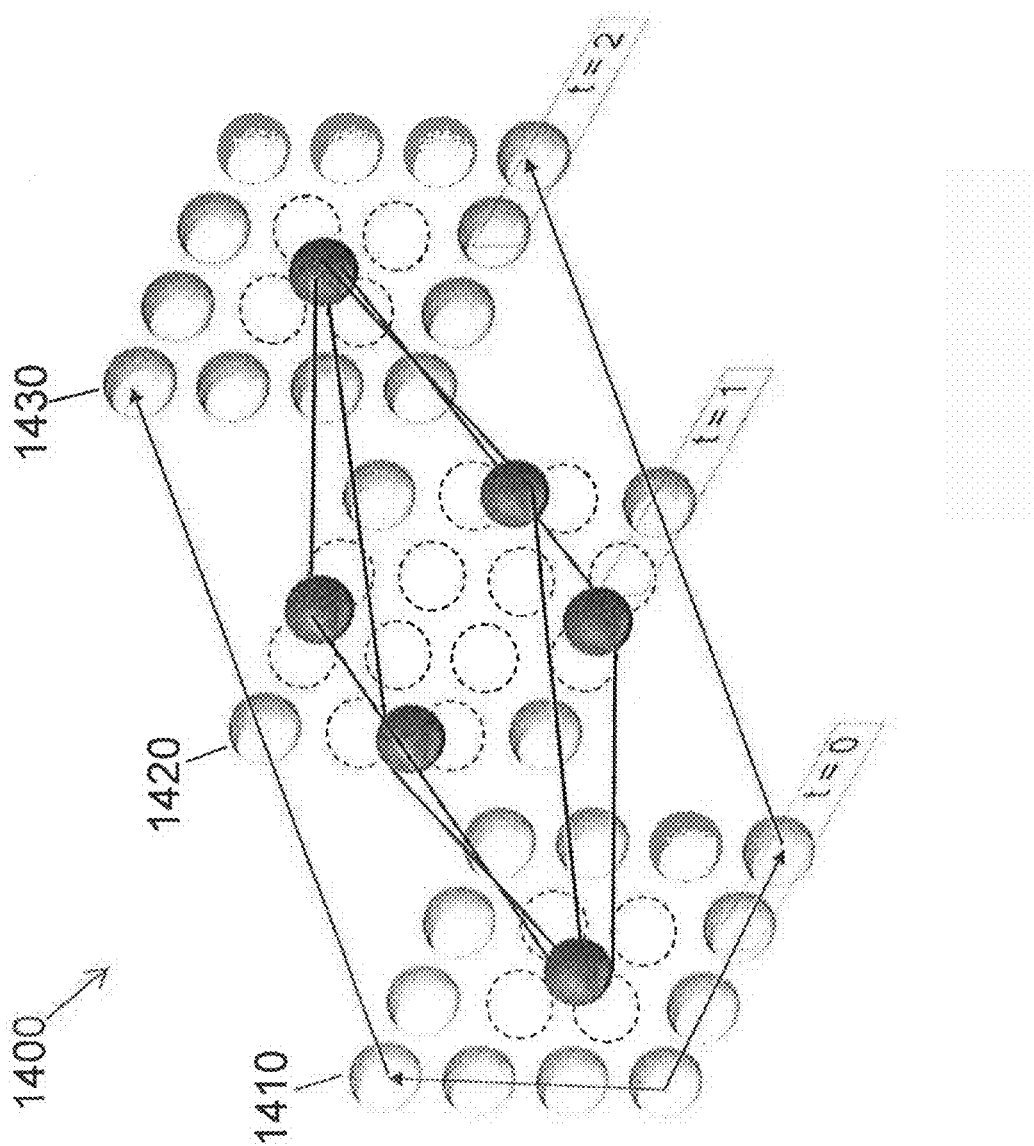
FIG. 14A is an exemplary diagram showing a dynamically resized floating macroblock over time with luma information utilized in compression.

In exemplary FIG. 14A, three times, t=0, t=1, and t=2 are again shown. In this example, luma information may be defined as a best-matched contiguous function where compression may be maximized. However, in some situations where a contiguous best matching function may not be defined, alternative vectors may be applied or utilized, as desired. In FIG. 14, the luma information over time may be shown in different vectors.

Referring now to exemplary FIG. 14B, a traditional frame sequence 1442, which may be sampled at a uniform rate, may be shown next to video plane sequence 1444, which may be sampled at a non-uniform rate. In frame sequence 1442, five exemplary times, t=0, t=1, t=2, t=3, and t=4, along with corresponding frames 1450, 1452, 1454, 1456, and 1458, respectively, may be shown. In such an exemplary embodiment, frame data may be sampled at the frames corresponding to specific uniform times, t=0, t=1, etc. However, in video plane sequence 1444, sampling may occur at any desired time. In such exemplary embodiments, a sampling time, such as t=n, may be utilized where t=n does not correspond to frame data, but rather corresponds to a video plane and data associated with the video plane. Thus, although times t=0 and t=4 may correspond to traditional frames 1450 and 1458, respectively, t=n may be any desired time and may not be associated with specific frame data. Additionally, times t=0 and t=4 may be considered as reference points instead of frame data, as the embodiments described herein may be performed with respect reference points or reference data, which may or may not correspond to specific frame data. As described herein, even if the reference data corresponds to, for example, a first and second frame, sampling between such frames may be done at any time and is not dependent on frame data between such references. For example, in this embodiment, t=n may correspond to a time at some point between frame 1456 at t=3 and frame 1458 at t=4. The data sampled at time t=n may be considered as video plane 1460 data. As further shown in exemplary FIG. 14C, t=n can be any non-uniform time. In this example, t=n can correspond to video plane 1462, which may correspond to a time between frame 1450 at t=0 and frame 1452 at t=1.

Exemplary FIG. 14D shows a further embodiment of non-uniform sampling. Here, as above, a traditional frame sequence 1442 can be shown. The plane sequence 1444 may have starting time t=o and ending time t=4, which may correspond to those of traditional frame sequence 1442. However, sampling may occur at any time, for example non-uniform times, and the data sampled may be video plane data, as described above. Thus, in this example, video plane 1464 may be at time t=n, video plane 1468 may be at time t=m, and video plane 1470 may be at time t=p. Each of t=n, t=m, and t=p may be times between frames 1450 and 1452 at t=0 and t=1, respectively. Similarly, video plane 1472 at time t=q and video plane 1474 at time t=r may be substantially between times t=2 and t=3. Further, video planes 1476 at time t=s and 1478 at time t=t may be substantially between times t=3 and t=4. Thus, it may be appreciated that sampling of video plane data may occur at any desired time. However, one of ordinary skill in the art may also see that while sampling may occur at non-uniform times, the video planes being sampled may be found, for example, between first and second reference frames, for example frame 1450 at t=0 and frame 1458 at t=4. Such reference data may be used as a basis for non-uniform sampling that may take place there between.

Figure 15A:
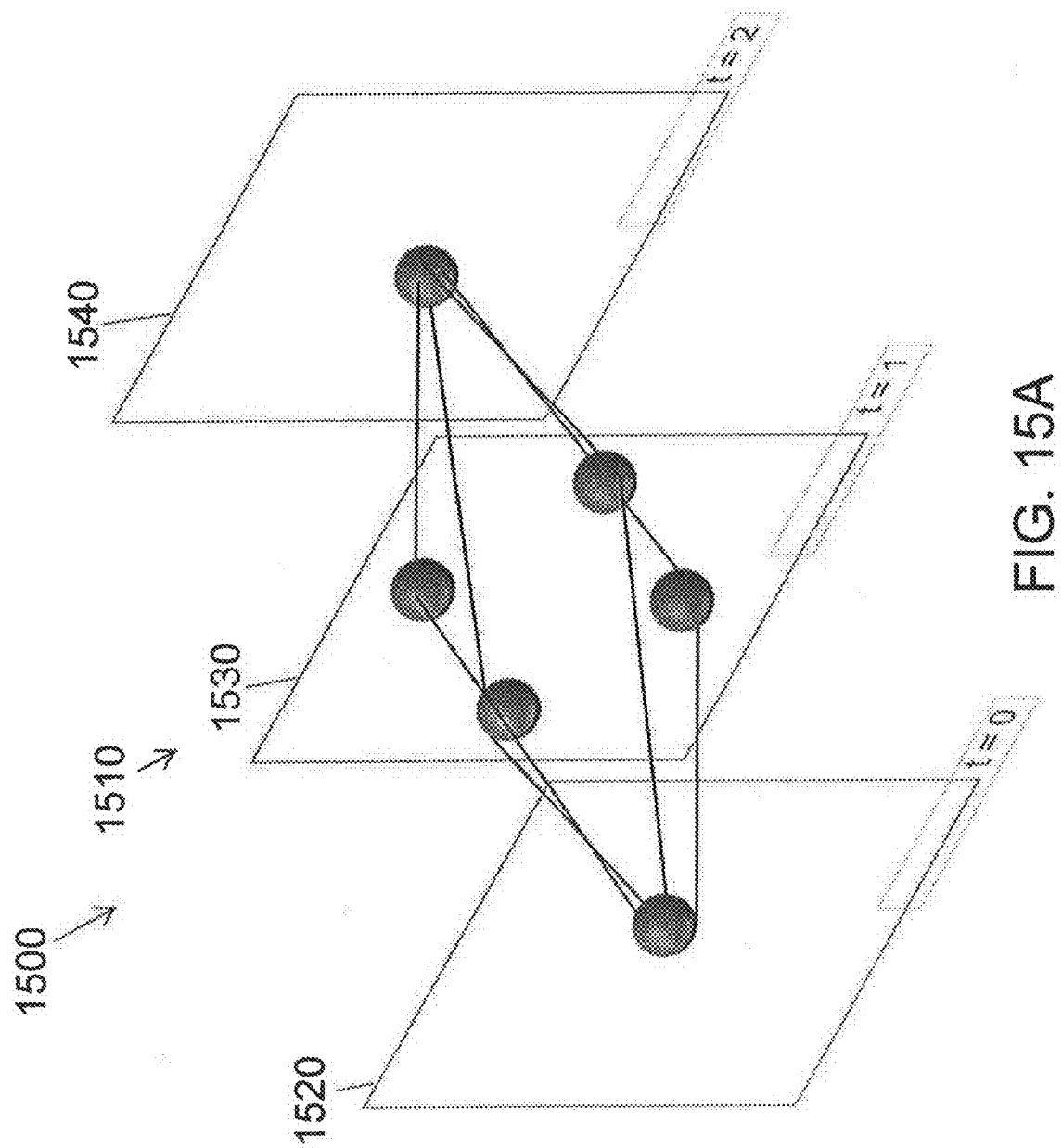
FIG. 15A is an exemplary diagram showing a three dimensional luma vector in macroblocks over time.

FIG. 15A is an exemplary diagram showing three dimensional luma vector 1500 in video planes 1510 over time. The video planes 1510 may include a first video plane 1520, a second video plane 1530 and a third video plane 1540 at different intervals, as opposed to more traditional frames, as shown above. The first video plane 1520 may be at t=0 and the like. The second video plane 1530 may be at t=1 and the like. The third video plane 1540 may be at t=2 and the like. However, and further to the above examples, the values of t between two reference points, for example t=0, t=1, and t=2, may be any non-uniform time. Therefore, although t=1 is indicated in exemplary FIG. 15A, t=1 may correspond to t=n insofar as it could be video plane data instead of traditional video frame data and may correspond to any time between reference points t=0 and t=2. FIG. 15A illustrates the three dimensional luma vector 1500 without a motion vector (not shown). Some vectors are not illustrated in FIG. 15A to avoid confusion.

Exemplary FIG. 15A provides an example of 3D luma vector, similar to a cutaway view of FIG. 14A, with only specific luma data that changes from time t=0 to time t=2. FIG. 15A shows an advantage that may be seen when introducing a floating video plane which may be dynamically resized.

FIG. 15B is an exemplary diagram showing a three dimensional luma vector 1500 with an octahedron space 1550 at various times, for example t=0, t=1, and t=2, although, as above, it can be appreciated that any video plane data between two reference frames or times may be utilized. The octahedron space 1550 may extend through the video planes 1510 such as the first video plane 1520, the second video plane 1530 and the third video plane 1540. It may be appreciated that, although the video plane data are shown at various exemplary times (e.g. t=0, t=1, t=2, and the like) that such an embodiment is frame independent. As such, a non-uniform sampling rate may be provided, as described above with respect to FIG. 14. As a result, during encoding, a video stream may be compressed based upon sampling at desired times and independent of frame data. Although frame data may ultimately be utilized with respect to decoding and reconstructing to display the video data, the time-based sampling in these and other exemplary embodiments can be non-uniform. This is further shown with respect to FIG. 15C.

FIG. 15C is an exemplary diagram showing a three dimensional luma vector 1500 with an octahedron space 1550 with a slice 1560 interpolated. Also, it may be noted that although the three dimensional luma vector is shown as an octahedron space in this exemplary embodiment, it will be appreciated that the three dimensional luma vector may be any three dimensional space or shape. The slice 1560 may be interpolated within the octahedron space 1550. The octahedron space 1550 may extend through the video planes 1510 such as the first video plane 1520, the second video plane 1530 and the third video plane 1540. The octahedron space 1550 may also include a plurality of luma vectors 1570. In such an exemplary embodiment, dynamic resolution management may be achieved. Here, for example a video plane 1580 at 0<t<1, the pixel information may be interpolated based on pixel information at t=0 and t=1, and it should be appreciated that any reference point t=n may correspond to any time, as above. Similar interpolations may be made at any other desired times between any reference frames or times.

Figure 15D:
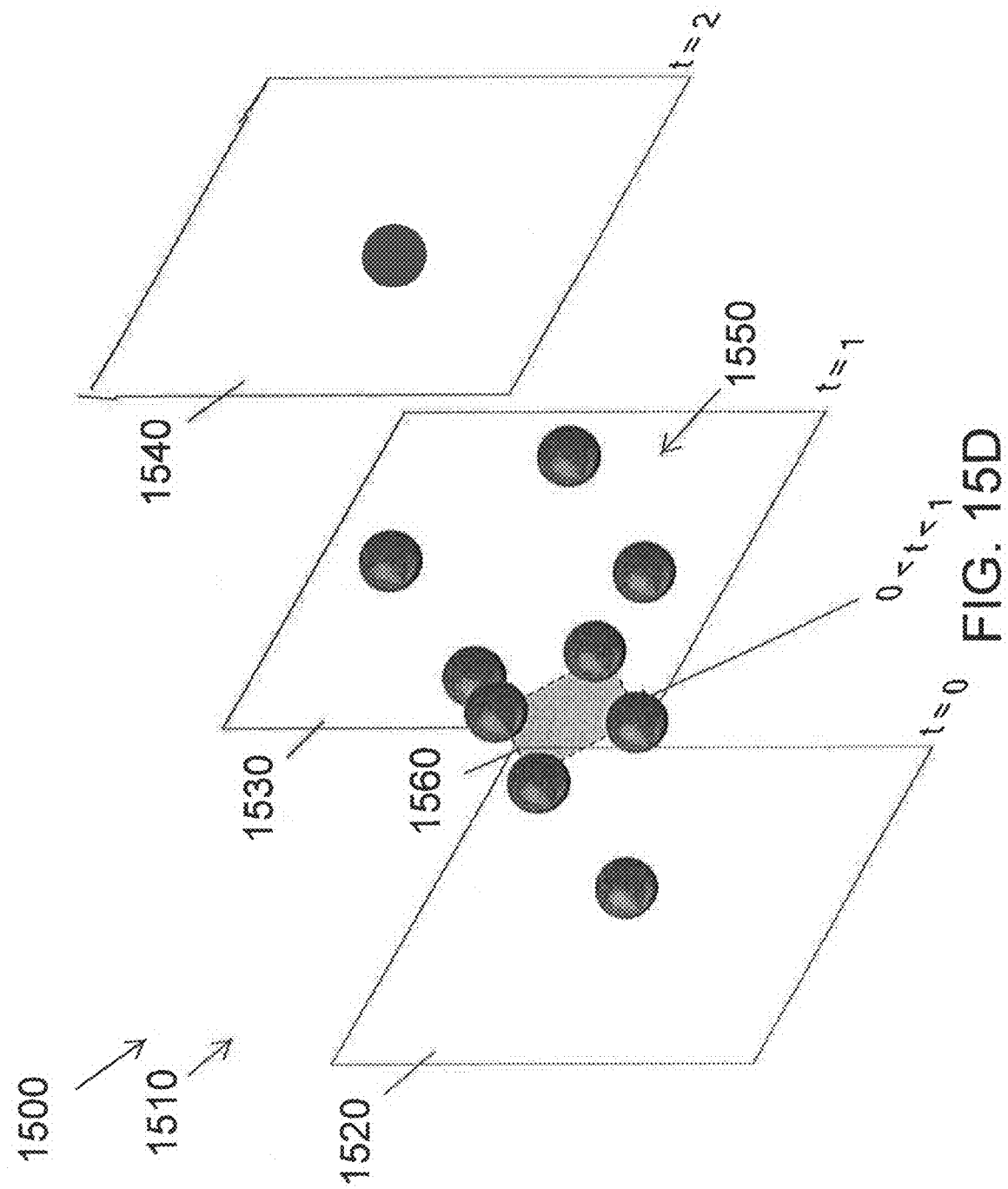
FIG. 15D is an exemplary diagram showing a three dimensional luma vector with an octahedron space with a slice interpolated.

FIG. 15D is an exemplary diagram showing a three dimensional luma vector 1500 with an octahedron space 1550 with a slice 1560 interpolated, as introduced above. FIG. 15D illustrates the octahedron space 1550 without a plurality of luma vectors (FIG. 15C, 1570). The slice 1560 may be interpolated within the octahedron space 1550. The octahedron space 1550 may extend through the video planes 1510 such as the first video plane 1520, the second video plane 1530 and the third video plane 1540. FIG. 15D shows an impact on frame rate and an interpolation that accommodates real-time changes to frame rate at point 0<t<1 that is between the frames, where any reference point t=n may correspond to any time, allowing for non-uniform sampling.

Figure 15E:
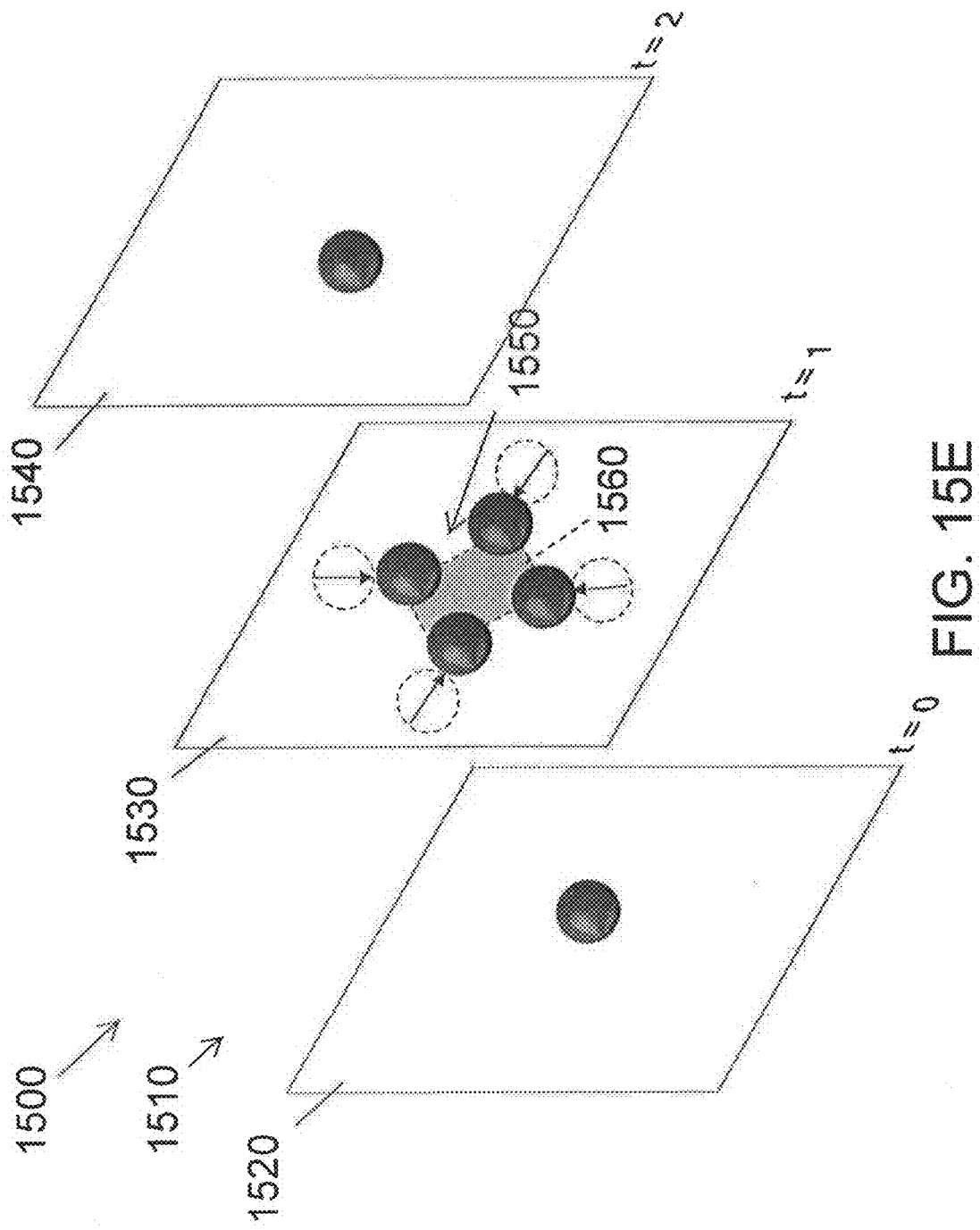
FIG. 15E is an exemplary diagram showing a reduced resolution of a three dimensional luma vector with an octahedron space with a slice interpolated.

FIG. 15E is an exemplary diagram showing a reduced resolution of a three dimensional luma vector 1500 with an octahedron space 1550 with a slice 1560 interpolated. This can also be viewed or interpreted as resolution management. For example, in this embodiment, if it is known that resolution is a representation of a vector in time, the data can be interpreted and manipulated to accommodate a desired resolution on a desired device. Thus, in FIG. 15E, the octahedron space 1550 may extend through the video planes 1510, such as the first video plane 1520, the second video plane 1530 and the third video plane 1540. The slice 1560 may be interpolated to accommodate real-time changes to resolution based on data from 0<t<1, where any reference point t=n may correspond to any time.

Continuing on the exemplary embodiment of FIG. 15E, FIG. 15F is an exemplary diagram showing an increased resolution of a three dimensional luma vector 1500 with an octahedron space 1550 with a slice 1560 interpolated. Here, using the principles described above, the octahedron space 1550 may extend through the video planes 1510, such as the first video plane 1520, the second video plane lock 1530 and the third video plane 1540. The slice 1560 may then be interpolated to accommodate real-time changes to resolution.

Figure 16:
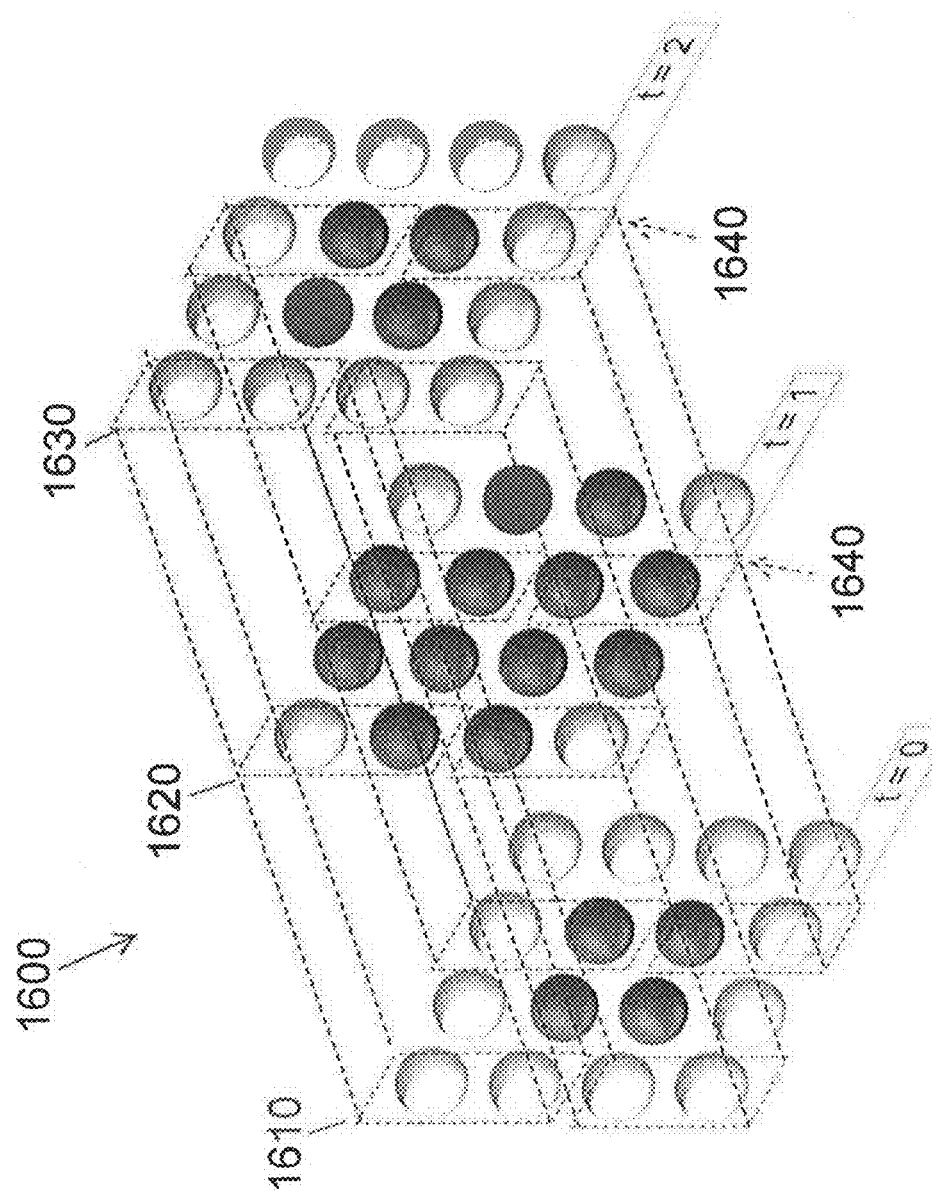
FIG. 16 is an exemplary diagram showing chroma data in macroblocks over time.

FIG. 16 is an exemplary diagram showing chroma data in video planes over time. The video plane 1600 may be dynamically resized. FIG. 16 illustrates a first video plane 1610, a second video plane 1620, a third video plane 1630 and chroma data 1640. The first video plane 1610 may be at t=0 and the like. The second video plane 1620 may be at t=1 and the like, although it may be appreciated that t=1 (or t=n) may correspond to any non-uniform time, as desired. The third video plane 1630 may be at t=2 and the like. The chroma data 1640 may not be compressed similarly, but may instead be stored as a linear function that may be interpolated at any point in time dimension.

Exemplary FIG. 16 provides an example of chroma compression utilizing aspects of the exemplary embodiments described herein. In some situations, chroma compression may be different from luma compression due to the nature of the changes from frame to frame or time to time. Chroma data may thus be stored as a linear function that may be interpolated at any point in time at an appropriate or desired dimension. In exemplary FIG. 16, chroma variations at time t=0, t=1, and t=2 may be shown, where any reference point t=n may correspond to any time.

In some further exemplary embodiments, a base video block (BVB) may be utilized. A BVB may be static, and may be a basic processing unit that is a multiple of approximate 4×4 pixels. Additionally, a dynamic BVB may be a basic process unit which may be of any size across a specific time frame.

Figure 17:
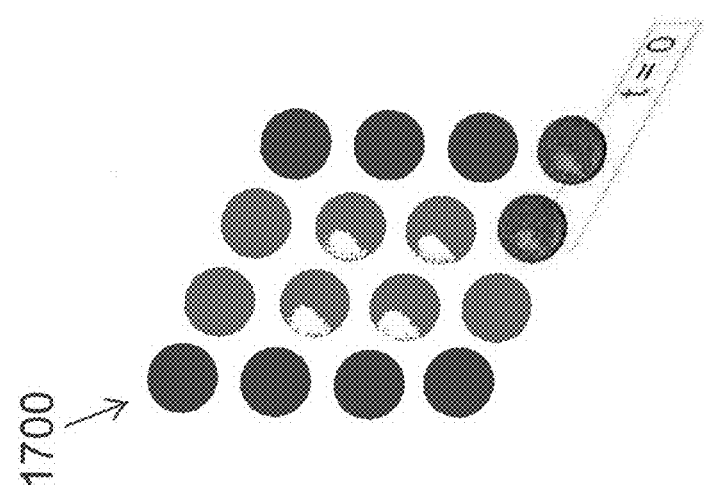
FIG. 17 is an exemplary diagram showing chroma data at a specified time.

FIG. 17 is an exemplary diagram showing chroma data 1700 at a specified time. The chroma data 1700 illustrated in FIG. 17 is at t=0.

Exemplary FIG. 17 may show an exemplary technique compression of chroma over time, beginning with a display of chroma data at time t=0.

Figure 18:
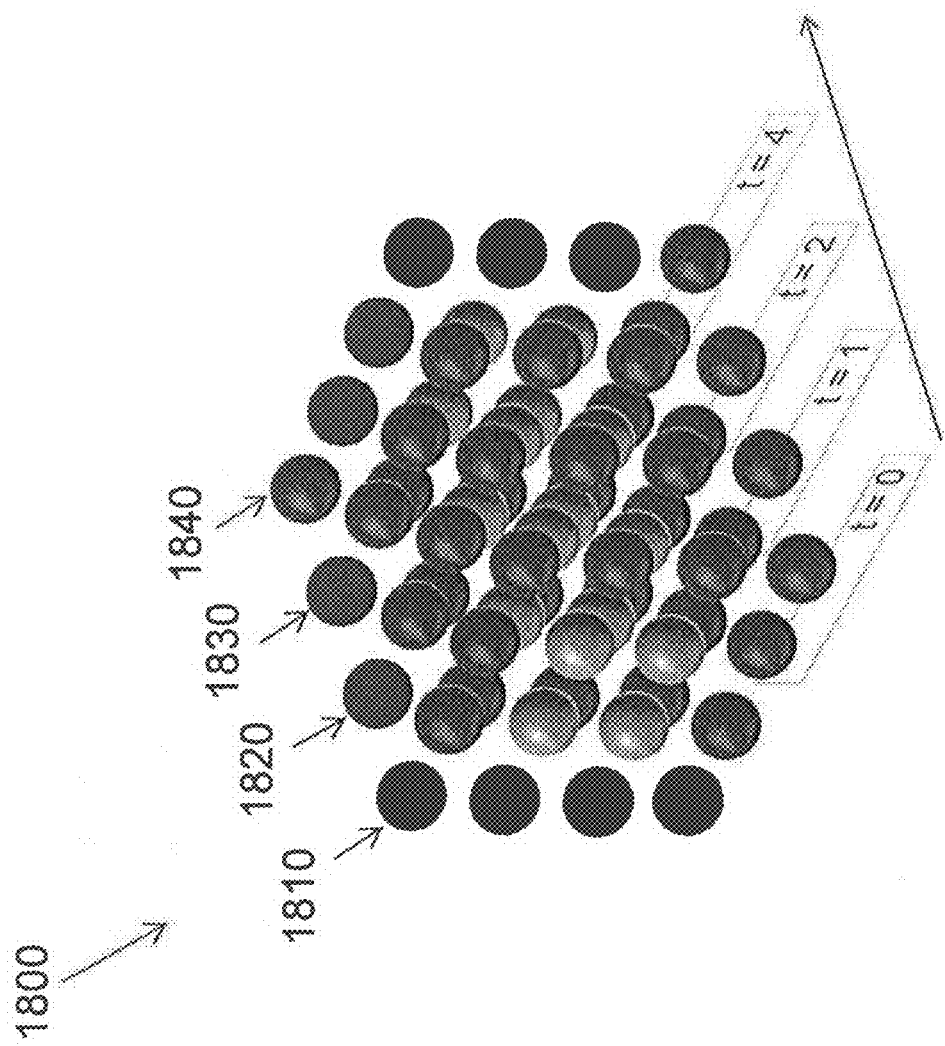
FIG. 18 is an exemplary diagram showing chroma data over time.

FIG. 18 is an exemplary diagram showing chroma data 1800 over time. FIG. 18 illustrates a first chroma data 1810, a second chroma data 1820, a third chroma data 1830 and a fourth chroma data 1840. The first chroma data 1810 may be at t=0 and the like. The second chroma data 1820 may be at t=1 and the like. The third chroma data 1830 may be at t=2 and the like. The fourth chroma data 1840 may be at t=4 and the like. As in the above examples, and any other exemplary embodiments described herein, it may be appreciated that any time t=n between reference frames may be non-uniform and the data sampled from therein may be video plane data.

Because changes in chroma are more highly variable than changes to luma, different techniques may be utilized. However, changes in chroma are often more predictable than changes in luma, for example due to color transitions. However, time intervals may again be utilized for the purposes of video compression. Therefore, exemplary FIG. 18 shows chroma values as they change at times t=0, t=1, t=2, and t=4.

Thus, from these examples, it may again be seen that luma and chroma vectors within a video plane may be extended into time vectors. This may be utilized to improve on the known methods of video compression and transmission that require frames be transmitted out of order (for example P frames before B frames) and then having to be reordered and reconstructed. Thus, in the present exemplary embodiments, the reconstruction of frame rate may be faster and more efficient. Additionally, it may be seen that luma vector across time may be defined as a contiguous, best fit function. This may allow for the compression of video data across time exclusively, instead of across frames. However, in some situations, it could be beneficial to utilize compression that integrates both time and frame data, and it should be appreciated that various techniques may be utilized to work in concert.

Figure 19:
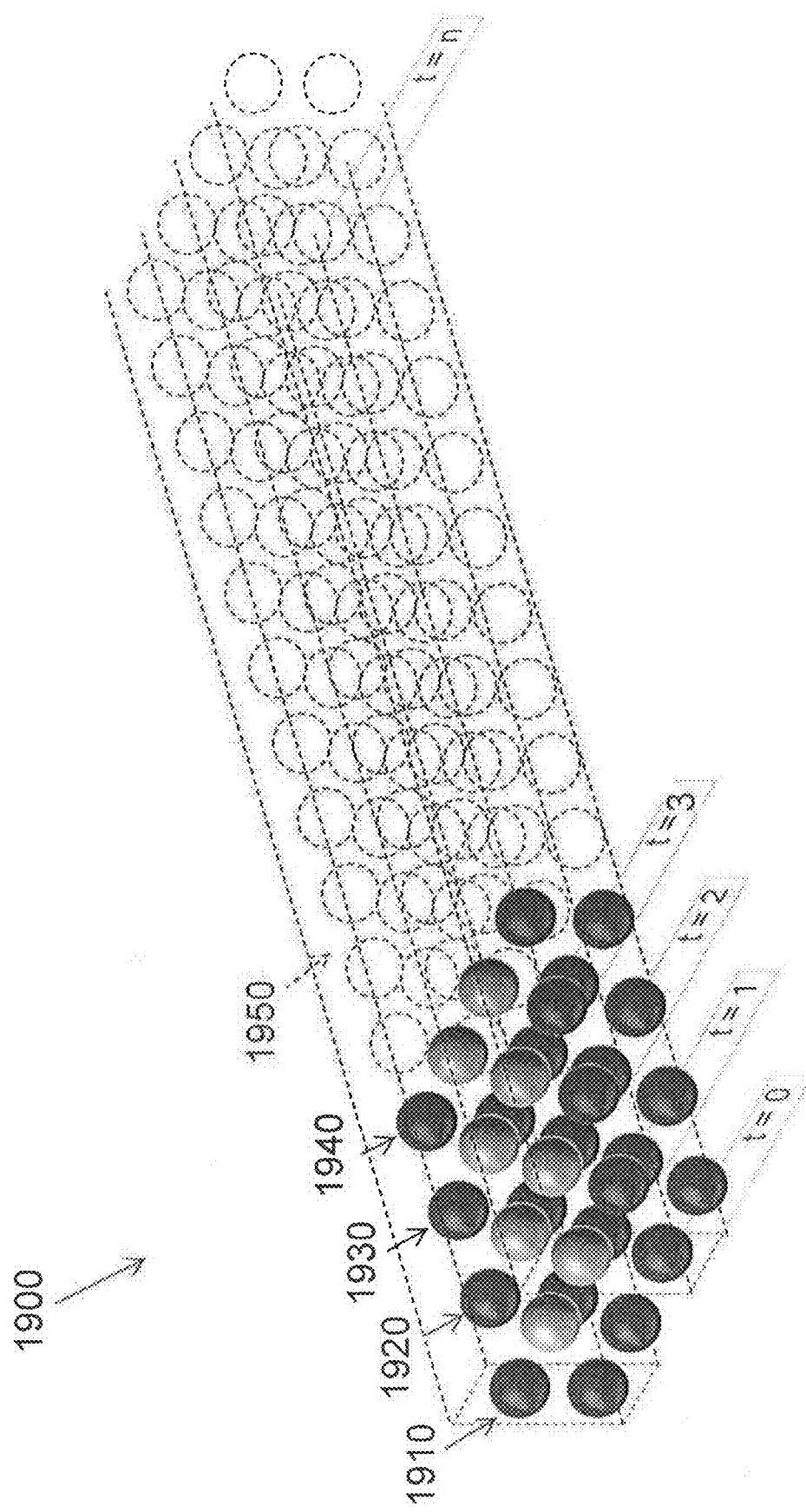
FIG. 19 is an exemplary diagram showing chroma data over time.

FIG. 19 is an exemplary diagram showing chroma data 1900 over time. FIG. 19 illustrates a first chroma data 1910, a second chroma data 1920, a third chroma data 1930, a fourth chroma data 1940 and additional chroma data 1950. The first chroma data 1910 may be at t=0 and the like. The second chroma data 1920 may be at t=1 and the like. The third chroma data 1930 may be at t=2 and the like. The fourth chroma data 1940 may be at t=3 and the like. The additional chroma data 1950 may be at t=n and the like. Further, in exemplary FIG. 19, chroma changes at reference points t=0, t=1, t=2, t=4, t=n are shown for a series of video planes, where t values may be any value, as described previously. As shown in this example, chroma values in a video plane may be considered at time intervals, rather than at frame intervals. Utilizing this data, and the more predictable nature of chroma values, future chroma values may be predicted.

Figure 20:
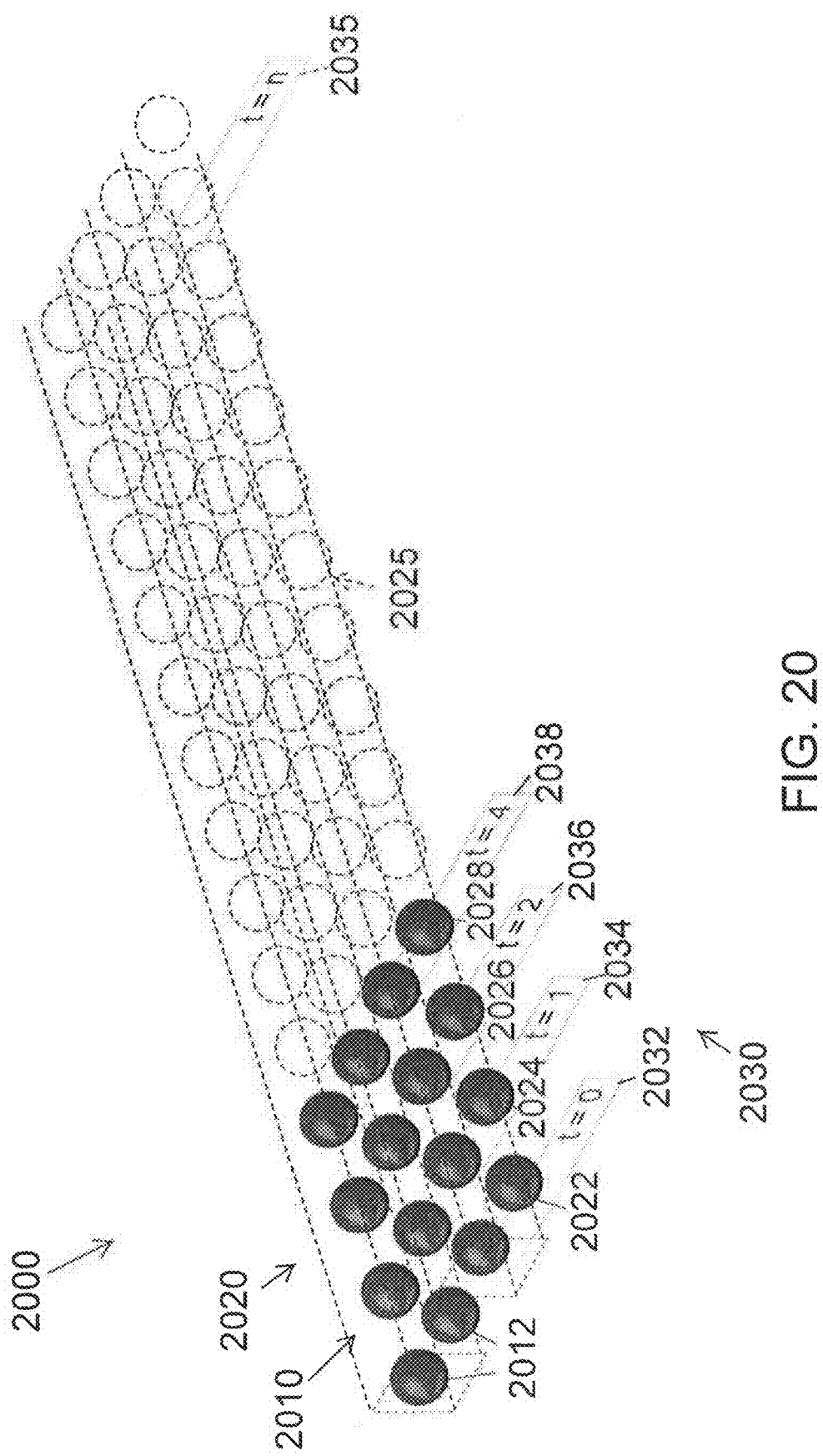
FIG. 20 is an exemplary diagram showing chroma data over time.

FIG. 20 is an exemplary diagram showing chroma data 2000 over time. The chroma data 2000 may include a video plane 2010, chroma data 2020 and chroma change times 2030. The video plane 2010 may include active lines 2012. The chroma data 2020 may include a first chroma data 2022, a second chroma data 2024, a third chroma data 2026, a fourth chroma data 2028 and additional chroma data 2025. The first chroma data 2022 may be at t=0 and the like. The second chroma data 2024 may be at t=1 and the like. The third chroma data 2026 may be at t=2 and the like. The fourth chroma data 2028 may be at t=4 and the like. The additional chroma data 2025 may be at t=n and the like. The chroma change times 2030 may be at t=0 2032, t=1 2034, t=2 2036, t=4 2038, t=n 2035 and the like. As above, any values for t are merely exemplary for use as reference points and t may be any time value.

As further shown in exemplary FIG. 20, a single active line of a video plane may be predicted based on a starting time, data collected at times after a starting time and extending to a time t=n. At some time t=n+1, a new time interval may be set, for example as time t (n+1)=0. From there, new chroma data may be collected and then predicted to a time t (n+1)=n. As shown in exemplary FIG. 20, the chroma data across the shown active line is unchanged from time t=0, to t=1, to t=2, to t=4. Utilizing such a time sample, it may thus be predicted that there may be little or effectively no change in chroma data from time t=0 to time t=n. As such, the chroma data for this line may be compressed and sent as a uniform value from time t=0, to time t=n, similar to the exemplary embodiment shown above with respect to FIG. 6. The term uniform value is defined as a chroma data value that is not variable from t=0, to t=1, to t=2, to t=4. As above, any values for t are merely exemplary for use as reference points and t may be any time value.

Figure 6:
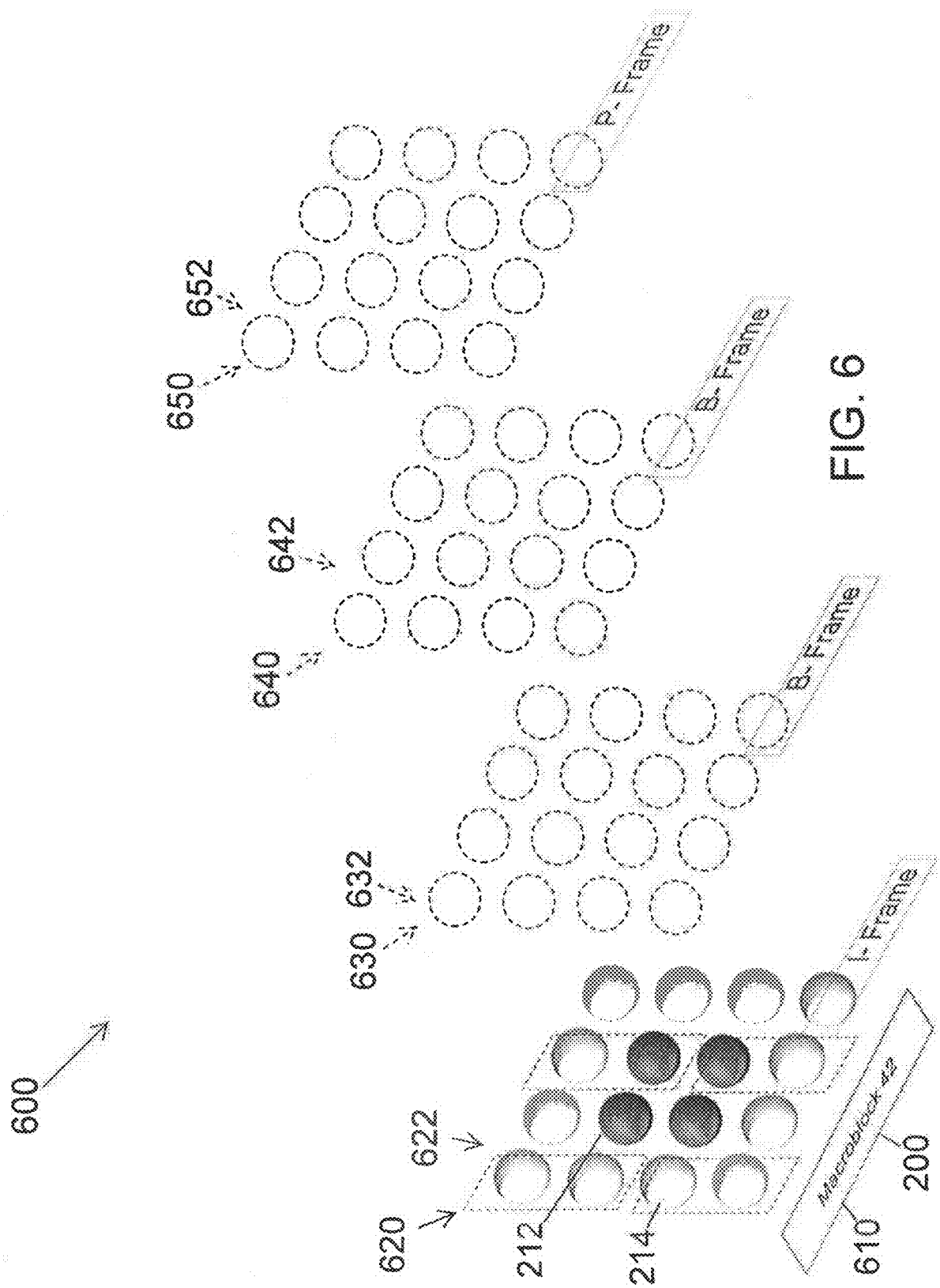
FIG. 6 is an exemplary diagram showing macroblock data interpreted over I, P, and B frames.

FIG. 6 is an exemplary diagram showing macroblock data interpreted over frames 600. In this example, because the luma and chroma values have not changed, only the original I-frame data needs to be stored along with the motion vector data. The frames 600 may include a macroblock 610, a first frame 620, a second frame 630, a third frame 640 and a fourth frame 650. The macroblock 610 may be a macroblock 200 (as shown in FIG. 2) with one or more pixel value black pixels 212, one or more pixel value white pixels 214 and the like. The first frame 620 may be an I-frame 622 and the like. The second frame 630 may be a first B-frame 632 and the like. The third frame 640 may be a second B-frame 642 and the like. The fourth frame 650 may be a P-frame 652 and the like. The second frame 630, the third frame 640 and the fourth frame 650 produce duplicate data referencing the first frame 620 or I-frame 622. The frames 600 may also be in any order, arrangement or orientation and the like. Linear, frame-based video compressions may be highly dependent on predetermined bit-rate, resolution, and frame rate constraints.

In a further exemplary embodiment, aspects of video compression, encoding, decoding, transmission and display may be performed by any of a variety of computing, processing, transmitting and viewing devices, components or system.

Figure 21:
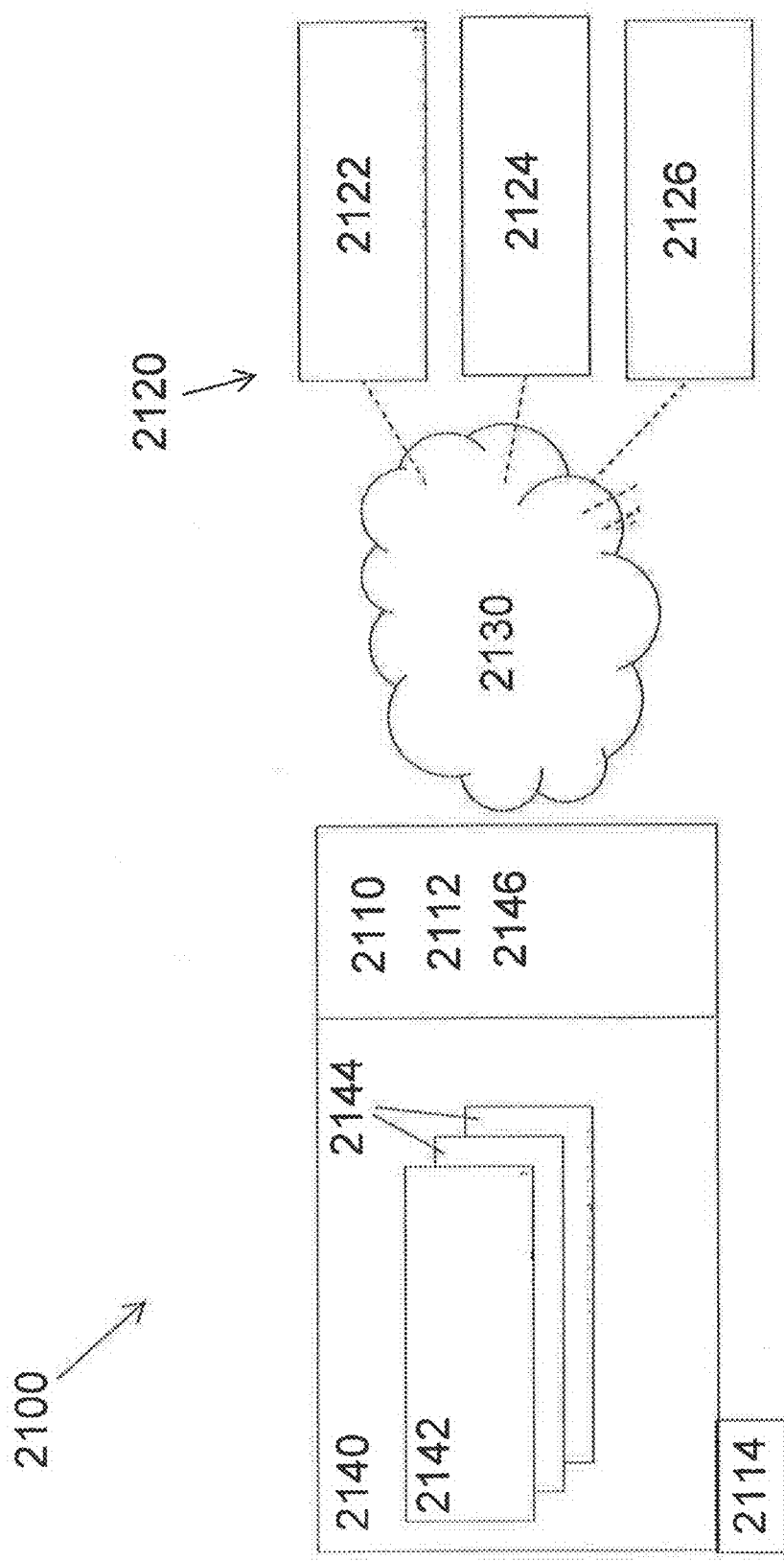
FIG. 21 is an exemplary diagram showing a system overview of a. system for video coding.

FIG. 21 is a system overview of a system 2100 for video coding. The system 2100 may include a server system 2110, client systems 2120, a communications network 2130 and a service provider 2140.

The server system 2110 may include one or more servers 2112. The one or more servers 2112 may be the property of the distributor of any related software or non-transitory storage media. In other embodiments, the system 2100 may include additional components and/or may not include all of the components listed above. Additionally, in some other exemplary embodiments, it may be appreciated that client systems 2120 may be a group of devices receiving a multicast or broadcast signal, for example evolved multimedia broadcast multicast service (eMBMS).

The client system 2120 accesses the server system 2110 via the communications network 2130. The client system 2120 is an example of a handheld wireless device 2122, such as a mobile phone with an operating system 2124 or a smartphone, a personal computer 2126 or other client system and the like. It may be appreciated that the client system 2120 may be different insofar as different client systems may be able to accommodate different resolutions or may be able to receive data at different or variable rates, depending on hardware capabilities, signal type, and signal strength.

The system 2100 illustrates some of the variations of the manners of connecting to the server system 2110, which may be an information providing website 2114. The server system 2110 may be directly connected and/or wirelessly connected to the plurality of client systems 2120 and are connected via the communications network 2130. Client systems 2120 may be connected to the server system 2110 via the communications network 2130.

The communications network 2130 may be any one of, or any combination of, one or more local area networks or LANs, wide area networks or WANs, wireless networks, telephone networks, the Internet and/or other networks. The client systems 2120 may be any system that an end user may use to access the server system 2110. For example, the client systems 2120 may be personal computers, smart televisions, workstations, laptop computers, game consoles, handheld network enabled audio/video players and/or any other network appliance. The communications network 2130 may accommodate different screen resolutions and bit rate constraints due to processing power and power management and may require one or more alternative video encoding and/or decoding techniques.

The service provider 2140 may provide one or more movies 2142 that may be displayed on the client systems 2120. The service provider 2140 may service thousands of client systems 2120 and available bandwidth combinations. The one or more movies 2142 may be H.264/MPEG-4 Advanced Video Coding standard (H.264/AVC) encoded 2144, or other suitable video coding standards utilized on various platforms at various times that are known and commonly utilized standards for video compression, including those described in exemplary embodiments herein. The H.264/AVC encoded 2144 movies may be encoded into multiple versions to accommodate major resolutions and bandwidth combinations. The one or more movies 2142 may have an approximate 720×1280, high bit rate, an approximate 320×480, low bit rate, an approximate 1136×640, high bit rate and the like. As such, the video data may be provided to any of a variety of client systems 2120 so that the data may be received at an optimal or desired bit rate. The service provider 2140 may utilize a content delivery network or content distribution network or CDN 2146 to serve the one or more movies 2142 to end-users with high availability and high performance. The H.264/AVC encoded 2144 movies may be unfeasible to encode, store and distribute to edge CDN 2144 all possible resolution and bit rate combinations. Proliferation of client systems on broadband networks such as Wireless Fidelity or Wi-Fi, third generation or 3G, fourth generation or 4G, fifth generation or 5G and Long Term Evolution or LTE with different screen resolutions and bit rate constraints due to processing power and/power management requires an alternative video encoding and decoding techniques.

In a further exemplary embodiment, and still referring to FIG. 21, the client system 2120 may be able to receive variable or dynamic data, depending on factors such as hardware capabilities, signal strength, and signal type, as described above. Thus, in this example, if there is a known downstream capacity at the client system 2120, the bit rate of video data received at the client system 2120 may be dynamically adjusted to the capacity of the client system 2120. Thus, the edge of the network 2130 may have encoded 2144 data (such as movie data 2142). The client system 2120 may access such data through the website 2114 and select a desired movie to view. At this time, the downstream capacity of the client system 2120 may be available to service provider 2140. Upon receipt of the downstream capacity of the client system 2120, the service provider, via CDN 2146 and the like, may then provide movie 2142 data to the client system 2120 such that it is optimized for the specific client system 2120. In other words, encoded 2144 data may be streamed onto the client system 2120 as it is coming off of the source movie 2142 file at the edge of the network 2130. Using decoding methodologies, such as those described herein, the client system 2120 may then decode and ultimately display the dynamically provided data in an efficient manner. Such an approach may limit capacity restraint issues associated with traditional CDNs.

Figure 22:
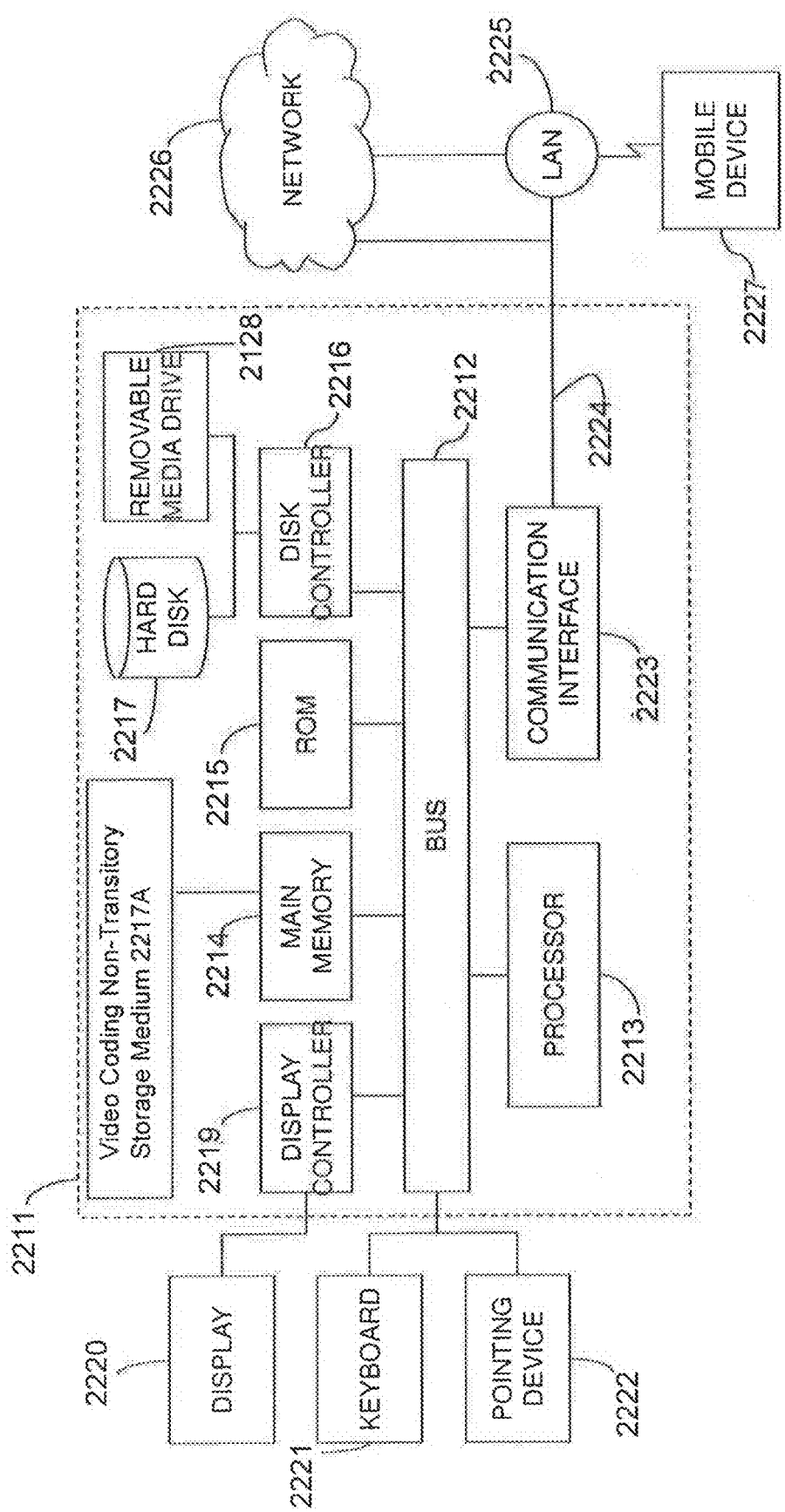
FIG. 22 is an exemplary diagram showing a block diagram of a server system.

FIG. 22 is a block diagram of a server system. Exemplary FIG. 22 illustrates an exemplary server system 2211 upon which an embodiment of the present invention may be implemented. The server system 2211 may include a bus 2212 or other communication mechanism for communicating information, and a processor 2213 coupled with the bus 2212 for processing the information. The server system 2211 also may include a main memory 2214, such as a random access memory (RAM) or other dynamic storage device (e.g., dynamic RAM (DRAM), static RAM (SRAM), and synchronous DRAM (SDRAM)), coupled to the bus 2212 for storing information and instructions to be executed by processor 2213. In addition, the main memory 2214 may be utilized for storing temporary variables or other intermediate information during the execution of instructions by the processor 2213. The server system 2211 further may include a read only memory (ROM) 2215 or other static storage device (e.g., programmable ROM (PROM), erasable PROM (EPROM), and electrically erasable PROM (EEPROM)) coupled to the bus 2212 for storing static information and instructions for the processor 2213.

The server system 2211 also may include a disk controller 2216 coupled to the bus 2212 to control one or more storage devices for storing information and instructions, such as a magnetic hard disk 2217, and a removable media drive 2218 (e.g., floppy disk drive, read-only compact disc drive, read/write compact disc drive, compact disc jukebox, tape drive, and removable magneto-optical drive). The storage devices may be added to the computer system 2211 utilizing an appropriate device interface (e.g., small computer system interface (SCSI), integrated device electronics (IDE), enhanced-IDE (E-IDE), direct memory access (DMA), or ultra-DMA).

Further, exemplary embodiments may include or incorporate at least one database which may store non-transitory storage media, descriptive data, system data, digital images and any other data item required by the other components necessary to effectuate any embodiment of the present system known to one having ordinary skill in the art. The database may be provided, for example, as a database management system (DBMS), a relational database management system (e.g., DB2, ACCESS, etc.), an object-oriented database management system (ODBMS), a file system or another conventional database package as a few non-limiting examples. The database may be accessed via a Structure Query Language (SQL) or other tools known to one having skill in the art.

Still referring to FIG. 22, the server system 2211 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The server system 2211 may also include a display controller 2219 coupled to bus 2212 to control a display 2220, such as a cathode ray tube (CRT), liquid crystal display (LCD) or any other type of display, for displaying information to a computer client. The computer system may include input devices, such as a keyboard 2221 and a pointing device 2222, for interacting with a computer client and providing information to the processor 2213. Additionally, a touch screen could be employed in conjunction with display 2220. The pointing device 2222, for example, may be a mouse, a trackball, or a pointing stick for communicating direction information and command selections to the processor 2213 and for controlling cursor movement on the display 2220. In addition, a printer may provide printed listings of data stored and/or generated by the server system 2211.

The server system 2211 may perform a portion or all of the processing steps of the invention in response to the processor 2213 executing one or more sequences of one or more instructions contained in a memory, such as the main memory 2214. Such instructions may be read into the main memory 2214 from another computer readable media, such as a hard disk 2217 or a removable media drive 2218. One or more processors in a multi-processing arrangement may also be employed to execute the sequences of instructions contained in main memory 2214. In alternative embodiments, hard-wired circuitry may be utilized in place of or in combination with non-transitory storage media instructions. Thus, embodiments are not limited to any specific combination of hardware circuitry and non-transitory storage media.

As stated above, the server system 2211 may include at least one computer readable media or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic media, compact discs (e.g., CD-ROM), or any other optical media, punch cards, paper tape, or other physical media with patterns of holes, a carrier wave (described below), or any other media from which a computer may read.

Stored on any one or on a combination of computer readable media, the present invention includes video coding non-transitory storage media 2217A for controlling the server system 2211, for driving a device or devices for implementing the invention, and for enabling the server system 2211 to interact with a human client. Such video coding non-transitory storage media 2217A may include, but is not limited to, device drivers, operating systems, development tools, and applications non-transitory storage media. Such computer readable media further includes the computer program product of the present invention for performing all or a portion (if processing is distributed) of the processing performed in implementing the invention. The video coding non-transitory storage media 2217A may integrate frame and time data. More specifically, the video coding non-transitory storage media 2217A may produce one or more luma vectors and one or more chroma vectors within a macroblock that may be extended into time vectors that may be utilized for reconstruction of a frame rate. The video coding non-transitory storage media 2217A may define luma vector across time as a contiguous well-suited function. The video coding non-transitory storage media 2217A may also perform video compression across a time dimension. The video compression may involve one or more movies 2242 that may have an approximate 720×1280, high bit rate, an approximate 320×480, low bit rate, an approximate 1136×640, high bit rate and the like. The service provider 2240 may utilize a content delivery network or content distribution network or CDN 2144 to serve the one or more movies 2242 to end-users with high availability and high performance.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable media" as used herein refers to any media that participates in providing instructions to the processor 2213 for execution. A computer readable media may take many forms, including but not limited to, non-volatile media, volatile media, and transmission media. Non-volatile media includes, for example, optical, magnetic disks, and magneto-optical disks, such as the hard disk 2217 or the removable media drive 2218. Volatile media includes dynamic memory, such as the main memory 2214. Transmission media includes coaxial cables, copper wire and fiber optics, including the wires that make up the bus 2212. Transmission media also may also take the form of acoustic or light waves, such as those generated during radio wave and infrared data communications.

Various forms of computer readable media may be involved in carrying out one or more sequences of one or more instructions to processor 2213 for execution. For example, the instructions may initially be carried on a magnetic disk of a remote computer. The remote computer may load the instructions for implementing all or a portion of the present invention remotely into a dynamic memory and send the instructions over a telephone line utilizing a modem. A modem local to the server system 2211 may receive the data on the telephone line and utilize an infrared transmitter to convert the data to an infrared signal. An infrared detector coupled to the bus 2212 may receive the data carried in the infrared signal and place the data on the bus 2212. The bus 2212 carries the data to the main memory 2214, from which the processor 2213 retrieves and executes the instructions. The instructions received by the main memory 2214 may optionally be stored on storage device 2217 or 2218 either before or after execution by processor 2213.

The server system 2211 also includes a communication interface 2223 coupled to the bus 2212. The communication interface 2223 provides a two-way data communication coupling to a network link 2224 that is connected to, for example, a local area network (LAN) 2225, or to another communications network 2226 such as the Internet. For example, the communication interface 2223 may be a network interface card to attach to any packet switched LAN. As another example, the communication interface 2223 may be a wireless link. In any such implementation, the communication interface 2223 sends and receives electrical, electromagnetic or optical signals that carry digital data streams representing various types of information.

The network link 2224 typically provides data communication through one or more networks to other data devices. For example, the network link 2224 may provide a connection to another computer or remotely located presentation device through a local network 2225 (e.g., an 802.11-compliant wireless network) or through equipment operated by a service provider, which provides communication services through a communications network 2226. In one embodiment, the local network 2224 and the communications network 2226 preferably utilize electrical, electromagnetic, or optical signals that carry digital data streams. The signals through the various networks and the signals on the network link 2224 and through the communication interface 2223, which carry the digital data to and from the server system 2211, are exemplary forms of carrier waves transporting the information. The server system 2211 may transmit and receive data, including program code, through the network(s) 2225 and 2226, the network link 2224 and the communication interface 2223. Moreover, the network link 2224 may provide a connection through a LAN 2225 to a client system 2227 such as a personal digital assistant (PDA) laptop computer, or cellular telephone. The LAN communications network 2225 and the communications network 2226 both utilize electrical, electromagnetic or optical signals that carry digital data streams. The signals through the various networks and the signals on the network link 2224 and through the communication interface 2223, which carry the digital data to and from the system 2211, are exemplary forms of carrier waves transporting the information. The processor system 2211 may transmit notifications and receive data, including program code, through the network (s), the network link 2224 and the communication interface 2223.

Figure 23:
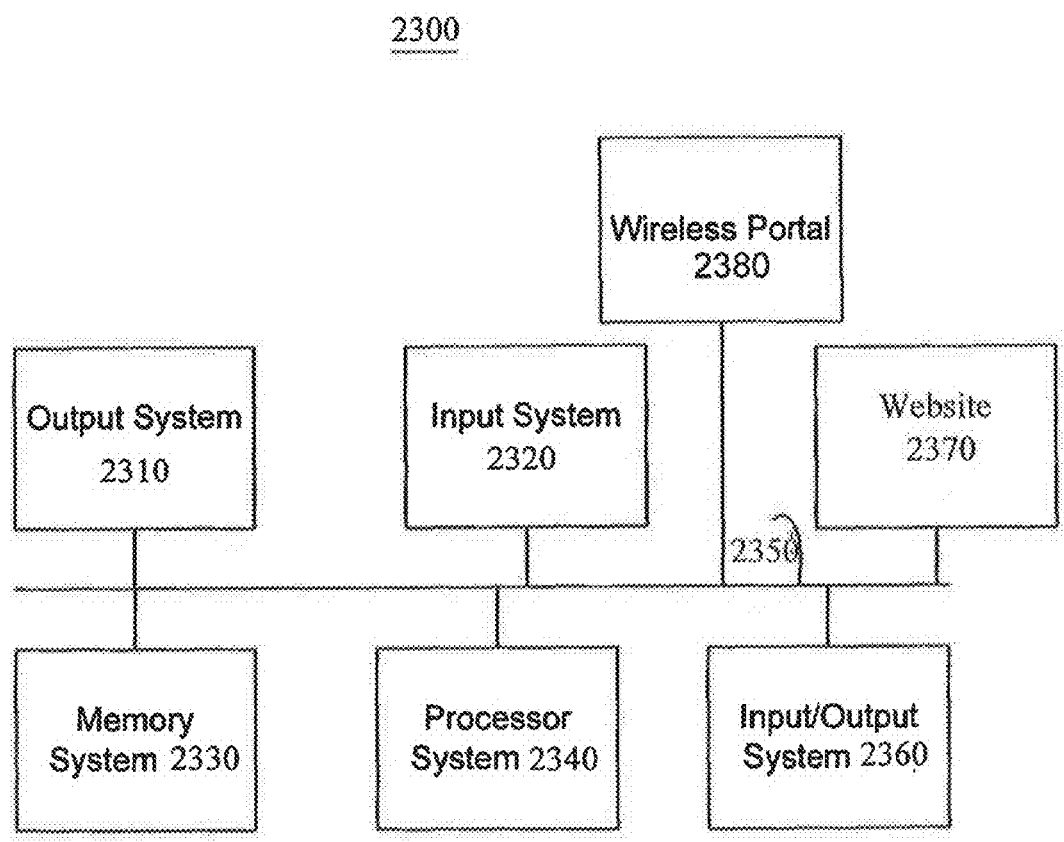
FIG. 23 is an exemplary diagram showing a block diagram of a client system.

FIG. 23 illustrates a block diagram of a client system 2300 that may be utilized as one of the system units for video coding. The client system 2300 may include an output system 2302, an input system 2304, a memory system 2306, a processor system 2308, a communications system 2312, an input/output system 2314, a website 2316 and a wireless portal 2318. Other embodiments of the client system 2300 may not have all of the components and/or may have other embodiments in addition to or instead of the components listed above.

The client system 2300 may be any one of the client systems 2120 and/or handheld wireless devices 2122 and a mobile phones with an operating system 2124 or smartphone or personal computers 2126 that may be utilized as one of the network devices of FIG. 21. In other embodiments, the client system 2300 may include additional components and/or may not include all of the components listed above. The output system 2310 may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, an intranet, and/or the Internet, for example.

The input system 2320 may include any one of, some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (e.g., Infrared Data Association or IrDA, Universal Serial Bus or USB), for example. The memory system 2330 may include, for example, any one of, some of, any combination of or all of a long term storage system, such as a hard drive, a short term storage system, such as a random access memory; a removable storage system, such as a floppy drive or a removable drive, and/or a flash memory. The memory system 2330 may include one or more machine readable medias that may store a variety of different types of information. The term machine readable media is utilized to refer to any media that is structurally configured for carrying information in a format that is readable by a machine. One example of a machine-readable media is a computer-readable media. The memory system 2330 also stores a non-transitory storage media for video coding (FIG. 22, 2217A).

The processor system 2340 may include any one of, some of, any combination of, or all of multiple parallel processors, a single processor, a system of processors having one or more central processors and/or one or more specialized processors dedicated to specific tasks. The processor system 2340 implements the programs stored in the memory system 2330. The communications system 2350 communicatively links the output system 2310, the input system 2320, the memory system 2330, the processor system 2340, and/or the input/output system 2360 to each other. The communications system 2350 may include any one of, some of, any combination of, or all of one or more electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

The input/output system 2360 may include devices that have the dual function as input and output devices. For example, the input/output system 2360 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 2360 is optional, and may be utilized in addition to or in place of the output system 2310 and/or the input device 2320.

The client systems 2120 and the handheld wireless device 2122 can also be tied into a website 2370 or a wireless portal 2380 which is also tied directly into the communications system 2350. Any website 2370 or wireless portal 2380 would also include non-transitory storage media (FIG. 22, 2217A) and a website module (no number) to maintain, allow access to and run the website 2370 as well.

Figure 24:
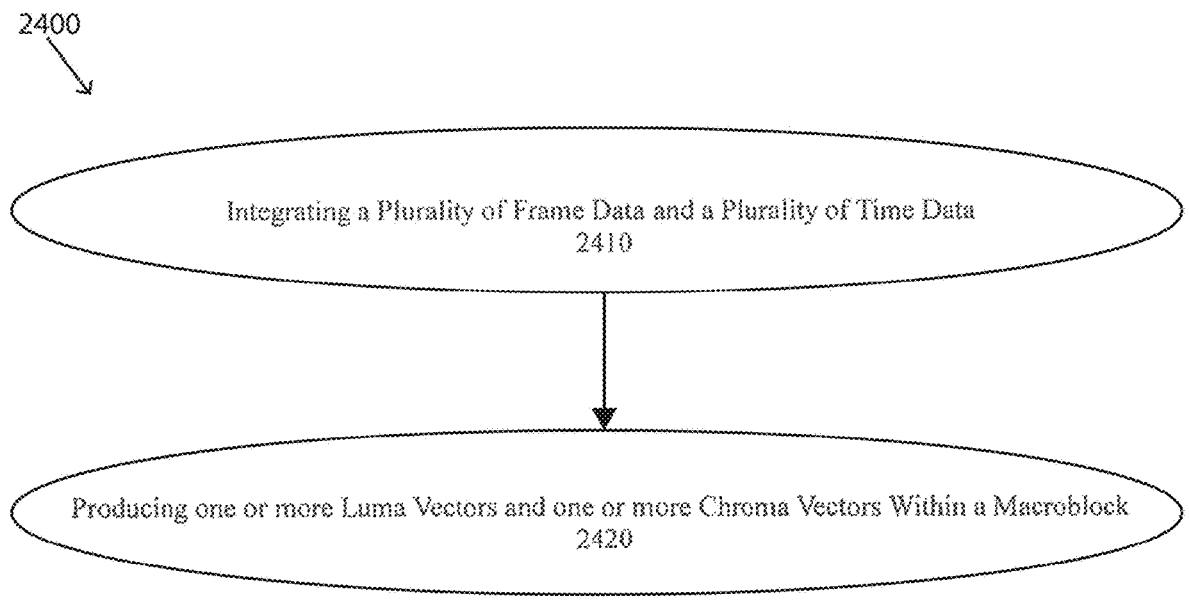
FIG. 24 is an exemplary diagram showing a flowchart of a method for video coding.

FIG. 24 is a flowchart of a method 2400 for video coding. The method 2400 includes the steps of integrating frame data and time data 2410 and producing one or more luma vectors and one or more chroma vectors within a macroblock 2420. The integrating step 2410 may include the one or more luma vectors and one or more chroma vectors decoding the frame data and the time data. The producing step 2420 may include video compression being performed across a time dimension. The method 2400 may be performed by a non-transitory computer storage media having instructions stored thereon which, when executed, execute the method.

Other aspects of the invention may include known methods of data transmission and Internet-related activities. Still other aspects of the invention may utilize wireless data transmission and the like.

The foregoing description and accompanying figures illustrate the principles, one or more embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for frameless video compression, comprising:
   - inputting video sequence information;
   - processing the input video information;
   - defining, from the processing of the input video information, a plurality of reference time instances within a time duration of the video sequence information, the reference time instances independent of frame data; and
   - producing, for each reference time instance in the plurality of reference time instances, video vectors for luma and chroma of the video sequence, wherein the video vectors are frame independent,
   - wherein the video vectors at one reference time instance are used to interpolate luma and chroma values of the video sequence at any time in between a current reference time instance and a next reference time instance, or if the current reference time instance is a last reference time instance, at any time beyond the last reference time instance within time bounded by the input video information.

2. The method for frameless video compression of claim 1, wherein the time instances are non-uniform times.

3. The method for frameless video compression claim 1, wherein the video vectors are obtained by utilizing floating macroblocks that are dynamically resized.

4. The method for frameless video compression of claim 1, wherein the video vectors represent data that can be manipulated to accommodate a desired resolution on a desired device.

* * * * *